(12) United States Patent
Yoo et al.

(10) Patent No.: US 12,381,675 B2
(45) Date of Patent: Aug. 5, 2025

(54) PORT ASSOCIATION WITH MULTIPLE DEMODULATION REFERENCE SIGNAL (DMRS) PORTS

(71) Applicant: QUALCOMM Incorporated, San Diego, CA (US)

(72) Inventors: Jae Won Yoo, San Diego, CA (US); Jing Jiang, San Diego, CA (US); Wei Yang, San Diego, CA (US); Yongle Wu, San Diego, CA (US); Vamsi Krishna Amalladinne, Fullerton, CA (US); Hari Sankar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/942,090

(22) Filed: Sep. 9, 2022

(65) Prior Publication Data
US 2024/0089047 A1    Mar. 14, 2024

(51) Int. Cl.
*H04W 72/04*    (2023.01)
*H04B 7/0456*    (2017.01)
*H04L 5/00*    (2006.01)
*H04W 72/044*    (2023.01)
*H04W 72/23*    (2023.01)

(52) U.S. Cl.
CPC ......... *H04L 5/0048* (2013.01); *H04B 7/0456* (2013.01); *H04W 72/046* (2013.01); *H04W 72/0473* (2013.01); *H04W 72/23* (2023.01)

(58) Field of Classification Search
CPC ... H04B 7/0456; H04L 5/0023; H04L 5/0048; H04L 5/0051; H04W 72/046; H04W 72/0473; H04W 72/23
See application file for complete search history.

(56) References Cited

U.S. PATENT DOCUMENTS

| | | | |
|---|---|---|---|
| 10,886,956 B2* | 1/2021 | Lee | ........................... H04L 1/00 |
| 2013/0308715 A1 | 11/2013 | Nam et al. | |
| 2017/0331535 A1 | 11/2017 | Wei et al. | |
| 2018/0220406 A1 | 8/2018 | Mizusawa | |
| 2019/0327056 A1* | 10/2019 | Chen | ......................... H04L 5/00 |
| 2022/0116801 A1 | 4/2022 | Dallal et al. | |
| 2023/0216565 A1* | 7/2023 | Kwak | .................. H04B 7/0695 |
| | | | 375/267 |
| 2024/0080692 A1 | 3/2024 | Jiang et al. | |

FOREIGN PATENT DOCUMENTS

| | | | | |
|---|---|---|---|---|
| EP | 3585117 A1 * | 12/2019 | ........... | H04B 17/104 |
| WO | WO-2019031096 A1 * | 2/2019 | ............. | B41F 21/00 |
| WO | WO-2022073154 A1 | 4/2022 | | |

\* cited by examiner

*Primary Examiner* — Phuc H Tran
(74) *Attorney, Agent, or Firm* — Holland & Hart LLP

(57) ABSTRACT

Methods, systems, and devices for wireless communications are described. A user equipment (UE) may receive an indication of an antenna port mapping from a network entity. The antenna port mapping may be between a tracking reference signal and a corresponding reference signal, the antenna port mapping indicating a mapping of a tracking reference signal port to a plurality of reference signal antenna ports associated with the corresponding reference signal. The UE may receive a tracking reference signal via the tracking reference signal port based on the antenna port mapping. The UE may perform a channel measurement procedure using the tracking reference signal based on the mapping.

30 Claims, 17 Drawing Sheets

PORT ASSOCIATION WITH MULTIPLE DEMODULATION REFERENCE SIGNAL (DMRS) PORTS

CROSS REFERENCE

The present Application for Patent claims priority to U.S. patent application Ser. No. 17/903,834 by JIANG et al., entitled "SPATIAL METRIC BASED MOBILITY PROCEDURES USING MULTI-PORT MOBILITY REFERENCE SIGNALS," filed Sep. 6, 2022, assigned to the assignee hereof, and expressly incorporated by reference herein.

FIELD OF TECHNOLOGY

The following relates to wireless communications, including multi-port phase tracking reference signal (PTRS) port association with multiple demodulation reference signal (DMRS) ports.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-port phase tracking reference signal (PTRS) port association with multiple demodulation reference signal (DMRS) ports. Generally, the described techniques enable a user equipment (UE) to perform channel measurement procedures by mapping a tracking reference signal (TRS) port to multiple reference signal ports. A UE may use the multiple reference signal ports to perform measurements to estimate the channel, which may result in more accurate channel estimations and noise estimations. For example, the UE may be configured with a mapping between a TRS port and multiple reference signal ports at the UE. In some examples, the UE may receive an indication of the mapping between the TRS port and multiple reference signal ports from a network entity, and the UE may receive a TRS from the network entity at a TRS port associated with one or more reference signal ports. The UE may measure the TRS at each of the reference signal ports to perform channel estimation procedures. In some examples, the mapping may be a fixed or semi-static mapping received from the network entity. Additionally, or alternatively, the mapping may be based on a pre-defined codebook configured at the UE. Additionally, or alternatively, the mapping may be based on the structure of the wireless channel, based on sounding RS (SRSs), based on a recommended mapping by the UE, a preference of the UE, or a combination thereof.

A method for wireless communication at a UE is described. The method may include receiving an indication of an antenna port mapping between a TRS and a corresponding reference signal, the antenna port mapping indicating a mapping of a TRS antenna port to a set of multiple reference signal antenna ports associated with the corresponding reference signal, receiving the TRS via the TRS antenna port based on the antenna port mapping between the TRS and the corresponding reference signal, and performing a channel measurement procedure using the TRS based on the mapping of the TRS antenna port to the set of multiple reference signal antenna ports.

An apparatus for wireless communication is described. The apparatus may include a processor, memory, and the processor being configured to, based at least in part on information stored in the memory receive an indication of an antenna port mapping between a TRS and a corresponding reference signal, the antenna port mapping indicating a mapping of a TRS antenna port to a set of multiple reference signal antenna ports associated with the corresponding reference signal, receive the TRS via the TRS antenna port based on the antenna port mapping between the TRS and the corresponding reference signal, and perform a channel measurement procedure using the TRS based on the mapping of the TRS antenna port to the set of multiple reference signal antenna ports.

Another apparatus for wireless communication is described. The apparatus may include means for receiving an indication of an antenna port mapping between a TRS and a corresponding reference signal, the antenna port mapping indicating a mapping of a TRS antenna port to a set of multiple reference signal antenna ports associated with the corresponding reference signal, means for receiving the TRS via the TRS antenna port based on the antenna port mapping between the TRS and the corresponding reference signal, and means for performing a channel measurement procedure using the TRS based on the mapping of the TRS antenna port to the set of multiple reference signal antenna ports.

A non-transitory computer-readable medium storing code for wireless communication at a UE is described. The code may include instructions executable by a processor to receive an indication of an antenna port mapping between a TRS and a corresponding reference signal, the antenna port mapping indicating a mapping of a TRS antenna port to a set of multiple reference signal antenna ports associated with the corresponding reference signal, receive the TRS via the TRS antenna port based on the antenna port mapping between the TRS and the corresponding reference signal, and perform a channel measurement procedure using the TRS based on the mapping of the TRS antenna port to the set of multiple reference signal antenna ports.

In some examples of the method, apparatuses, and non-transitory computer-readable medium described herein, receiving the TRS may include operations, features, means, or instructions for receiving the TRS via a set of multiple reception chains at the UE.

In some examples of the method, apparatuses, and non-transitory computer-readable medium described herein, performing the channel measurement procedure using the TRS may include operations, features, means, or instructions for performing a channel estimation using the set of multiple reception chains based on the TRS and the antenna port mapping of the TRS antenna port to the set of multiple reference signal antenna ports.

In some examples of the method, apparatuses, and non-transitory computer-readable medium described herein, performing the channel estimation using the set of multiple reception chains may include operations, features, means, or instructions for determining a respective parameter for each of the set of multiple reception chains.

Some examples of the method, apparatuses, and non-transitory computer-readable medium described herein may further include operations, features, means, or instructions for determining the antenna port mapping based on an effective channel associated with the set of multiple reference signal antenna ports and an effective channel associated with the TRS antenna port.

In some examples of the method, apparatuses, and non-transitory computer-readable medium described herein, receiving the indication of the antenna port mapping may include operations, features, means, or instructions for receiving the indication of the antenna port mapping as a fixed mapping, a semi-static mapping, or both, where the antenna port mapping may be based on a vector of respective parameters for each of one or more reception chains.

In some examples of the method, apparatuses, and non-transitory computer-readable medium described herein, receiving the indication of the antenna port mapping may include operations, features, means, or instructions for receiving the indication of the antenna port mapping, where the antenna port mapping may be based on a codebook of precoder values.

In some examples of the method, apparatuses, and non-transitory computer-readable medium described herein, determining the antenna port mapping may include operations, features, means, or instructions for receiving the indication of the antenna port mapping via periodic signaling, aperiodic signaling, or a combination thereof.

In some examples of the method, apparatuses, and non-transitory computer-readable medium described herein, receiving the indication of the antenna port mapping may include operations, features, means, or instructions for receiving an indication of a precoder value associated with the antenna port mapping, where the precoder value may be based on a structure of an effective channel of the TRS antenna port, an SRS, a channel state information (CSI) report, or a combination thereof.

In some examples of the method, apparatuses, and non-transitory computer-readable medium described herein, the TRS includes a PTRS.

In some examples of the method, apparatuses, and non-transitory computer-readable medium described herein, the corresponding reference signal includes a demodulation reference signal and the method, apparatuses, and non-transitory computer-readable medium may include further operations, features, means, or instructions for receiving a set of multiple demodulation reference signals via a set of multiple demodulation reference signal antenna ports, where the set of multiple reference signal antenna ports includes the set of multiple demodulation reference signal antenna ports and performing the channel measurement procedure using the PTRS, where the channel measurement procedure includes performing a channel noise error estimation using a set of multiple reception chains associated with a PTRS antenna ports, where the channel noise error estimation includes a phase noise error estimation, a residual frequency error estimation, or both.

In some examples of the method, apparatuses, and non-transitory computer-readable medium described herein, the TRS includes a channel state information reference signal for tracking.

In some examples of the method, apparatuses, and non-transitory computer-readable medium described herein, the corresponding reference signal includes a demodulation reference signal and the method, apparatuses, and non-transitory computer-readable medium may include further operations, features, means, or instructions for receiving a set of multiple demodulation reference signals via the set of multiple demodulation reference signal antenna ports and performing the channel measurement procedure using the channel state information reference signal for tracking, where the channel measurement procedure includes performing a channel estimation using a set of multiple reception chains associated with the set of multiple channel state information reference signal antenna ports.

In some examples of the method, apparatuses, and non-transitory computer-readable medium described herein, the channel estimation includes a signal-to-noise ratio, a channel correlation value in frequency domain, a channel correlation value in time domain, a delay spread, a Doppler spread, Doppler shifts, a channel power delay profile, or any combination thereof.

A method for wireless communication at a network entity is described. The method may include transmitting, to a UE, an indication of an antenna port mapping between a TRS and a corresponding reference signal, the antenna port mapping indicating a mapping of a TRS antenna port to a set of multiple reference signal antenna ports associated with the corresponding reference signal and transmitting the TRS.

An apparatus for wireless communication is described. The apparatus may include a processor, memory, and the processor being configured to, based at least in part on information stored in the memory transmit an indication of an antenna port mapping between a TRS and a corresponding reference signal, the antenna port mapping indicating a mapping of a TRS antenna port to a set of multiple reference signal antenna ports associated with the corresponding reference signal and transmit the TRS.

Another apparatus for wireless communication is described. The apparatus may include means for transmitting an indication of an antenna port mapping between a TRS and a corresponding reference signal, the antenna port mapping indicating a mapping of a TRS antenna port to a set of multiple reference signal antenna ports associated with the corresponding reference signal and means for transmitting the TRS.

A non-transitory computer-readable medium storing code for wireless communication at a network entity is described. The code may include instructions executable by a processor to transmit, to a UE, an indication of an antenna port mapping between a TRS and a corresponding reference signal, the antenna port mapping indicating a mapping of a TRS antenna port to a set of multiple reference signal antenna ports associated with the corresponding reference signal and transmit the TRS.

In some examples of the method, apparatuses, and non-transitory computer-readable medium described herein, transmitting the indication of the antenna port mapping may include operations, features, means, or instructions for transmitting the indication of the antenna port mapping as a fixed mapping, a semi-static mapping, or both, and where the antenna port mapping may be based on a vector of respective parameters for each of a set of multiple reception chains.

In some examples of the method, apparatuses, and non-transitory computer-readable medium described herein, transmitting the indication of the antenna port mapping may include operations, features, means, or instructions for transmitting the indication of the antenna port mapping, where the antenna port mapping may be based on a codebook of precoder values.

In some examples of the method, apparatuses, and non-transitory computer-readable medium described herein, transmitting the indication of the antenna port mapping may include operations, features, means, or instructions for transmitting an indication of a precoder value associated with the antenna port mapping, where the precoder value may be based on a structure of an effective channel of the TRS antenna port, a SRS, a CSI report, or a combination thereof.

In some examples of the method, apparatuses, and non-transitory computer-readable medium described herein, the TRS includes a PTRS.

In some examples of the method, apparatuses, and non-transitory computer-readable medium described herein, the corresponding reference signal includes a DMRS and the method, apparatuses, and non-transitory computer-readable medium may include further operations, features, means, or instructions for transmitting a set of multiple DMRSs via a set of multiple DMRS antenna ports, where the set of multiple reference signal antenna ports includes the set of multiple DMRS antenna ports.

In some examples of the method, apparatuses, and non-transitory computer-readable medium described herein, the TRS includes a channel state information reference signal (CSI-RS) for tracking.

In some examples of the method, apparatuses, and non-transitory computer-readable medium described herein, the corresponding reference signal includes a DMRS and the method, apparatuses, and non-transitory computer-readable medium may include further operations, features, means, or instructions for transmitting a set of multiple DMRSs via the set of multiple DMRS antenna ports, where the set of multiple reference signal antenna ports includes the set of multiple DMRS antenna ports.

DETAILED DESCRIPTION

Figure 1:
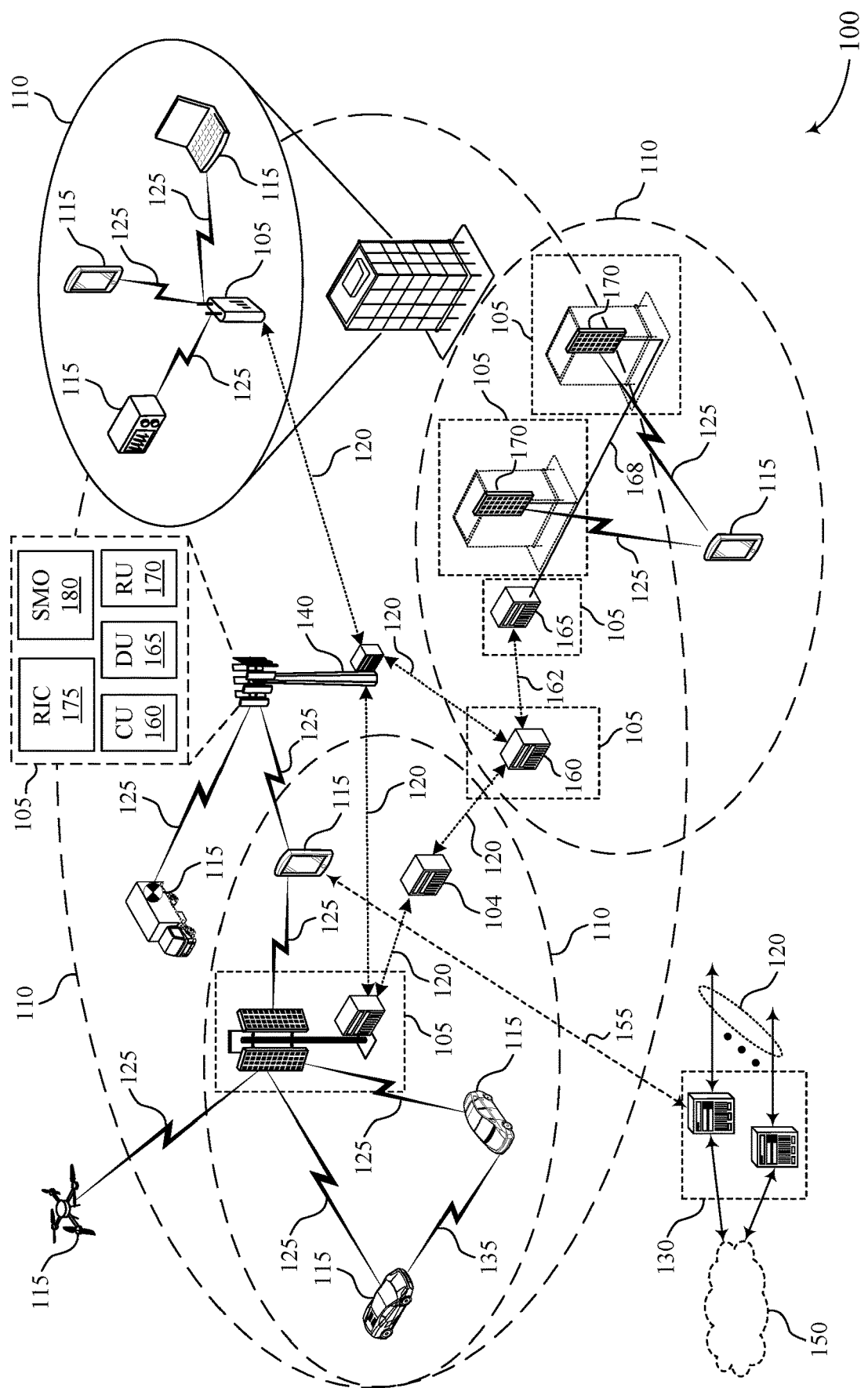
FIG. 1 illustrates an example of a wireless communications system that supports multi-port phase tracking reference signal (PTRS) port association with multiple demodulation reference signal (DMRS) ports in accordance with one or more aspects of the present disclosure.

Some wireless communications systems may implement tracking reference signals (TRSs) to perform channel measurement procedures. For example, a user equipment (UE) may determine phase or phase noise by measuring a phase TRS (PTRS) received at a PTRS port from a network entity. Each PTRS port may be configured to be associated with a single demodulation reference signal (DMRS) port at the UE. Additionally, a UE may use channel state information reference signals (CSI-RSs) for tracking to perform channel estimation procedures using demodulation reference signals (DMRS) or DMRS ports. In some wireless communications systems, a network entity may transmit a TRS to the UE. The TRS may include PTRSs, CSI-RSs, or both for performing tracking procedures. The TRS may be mapped to an antenna port at the UE, and the UE may track the TRS to perform channel measurement procedures based on the TRS and the antenna port.

However, phase noise and channel estimations may vary across reception chains, and phase noise measurements and channel estimations of relatively weak reception chains may be unreliable. This may result in inadequate or inaccurate phase noise error correction, increased system latency, and decreased throughput.

Techniques, systems, and devices described herein enable a UE to perform channel measurement procedures by mapping a TRS port to multiple reference signal ports. The UE may use the multiple reference signal ports to estimate the channel, which may result in more accurate channel estimations and noise estimations. For example, the UE may be configured with a mapping between a TRS (e.g., PTRS and/or CSI-RS for tracking) port and multiple reference signal (e.g., DMRS) ports at the UE. In some examples, the UE may receive an indication of the mapping between the TRS port and multiple reference signal ports, and the UE may receive a TRS from a network entity at a TRS port associated with one or more DMRS ports. The UE may measure the TRS at each of the reference signal ports to perform channel estimation procedures (e.g., the UE may determine phase noise error or other channel properties at each reception chain for the channel based on the estimation). In some examples, the mapping may be a fixed or semi-static mapping received from the network entity. Additionally, or alternatively, the mapping may be based on a pre-defined codebook configured at the UE. Additionally, or alternatively, the mapping may be based on the structure of the wireless channel. For example, the network entity may determine a precoder value for the TRS ports based on sounding RS (SRSs), based on a recommended mapping by the UE, or both.

Aspects of the disclosure are initially described in the context of wireless communications systems. Aspects of the disclosure are further illustrated and described with reference to an reference signal scheme, an antenna port mapping scheme, and a process flow. Aspects of the disclosure are further illustrated by and described with reference to apparatus diagrams, system diagrams, and flowcharts that relate to multi-port PTRS port association with multiple DMRS ports.

FIG. 1 illustrates an example of a wireless communications system 100 that supports multi-port PTRS port association with multiple DMRS ports in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-port PTRS port association with multiple DMRS ports as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time.

For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS) or a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support communications between a transmitter (e.g., at a network entity 105) and a receiver (e.g., at a UE 115). The communications may be associated with a level of noise caused by the wireless devices or interference in the channel between the transmitter and the receiver. For example, the receiver and the transmitter may each include one or more that allow for a receiver and a transmitter to receive and transmit a signal, respectively, by converting a received direction current (DC) signal into a periodic signal. Non-ideal oscillators, however, may result in a level of phase noise (e.g., common phase error) and intercarrier (or inter-cell) inference (ICI) in a transmitted (e.g., downlink) signal, which may limit a received signal-to-noise ratio (SNR) at the UE 115. For example, the phase noise may be defined by Equation 1:

$$Y[k]=X[k]\exp(j\varphi)+ICI[k] \qquad (1)$$

where $X[k]\exp(j\varphi)$ corresponds to a non-ideal oscillator noise and $ICI[k]$ corresponds to the ICI.

Oscillators operating a higher frequency bands (e.g., FR2) may be associated with higher levels of phase noise, which may be associated with less reliable communications. 5G NR wireless systems may support using TRSs to perform channel estimations. In some examples, in 5G NR, a network entity 105 and a UE 115 may use PTRSs and PTRS antenna ports to track and adjust (e.g., compensate) for phase noise at the transmitter or receiver. In some examples, the network entity 105 may transmit one or more PTRSs to a UE 115 via one or more reception chains at one or more PTRS ports of the UE 115. A PTRS port may be associated (e.g., quasi co-located) with a single DMRS antenna port at the UE 115. A UE 115 may be associated with multiple DMRS ports, where each DMRS port may be associated with (e.g., assigned to) receiving a specific signal. For example, the network entity 105 may transmit a single PTRS associated with a single signal codeword (e.g., codeword 0), and the UE 115 may use a single reception chain and PTRS port to receive the PTRS, which may be associated with the codeword of the signal. In this example, the PTRS port may be associated with the lowest indexed DMRS port of the multiple DMRS ports used for reception of physical downlink shared channel (PDSCH) at the UE 115.

In another example, the network entity 105 may transmit multiple PTRSs (e.g., two PTRSs) associated with two signal codewords, and the PTRS antenna port at the UE 115 may be associated with the lowest indexed DMRS port of the multiple DMRS ports used for receiving signals with relatively higher modulation coding schemes (MCSs) (e.g., two codewords (codeword 0 and codeword 1)). In this example, each of the two codewords may be associated with an MCS, and if the MCSs of the two codewords are equal, the PTRS port associated with the lowest indexed DMRS port may be assigned to the first codeword (e.g., codeword 0). As such, the phase noise associated with each PTRS and each codeword may be independent across reception chains of the UE based on the radio frequency (RF) implementation (e.g., the UE 115 may perform phase noise estimation for each reception chain associated with the PTRS, the PTRS port, and the respective DMRS port). However, the UE 115 may use the DMRS port associated with the PTRS port to perform beam-forming procedures in order to communicate with the network entity, which may result in a reception chain noise imbalance (e.g., the beamforming procedures may interfere and result in increased noise at one or more reception chains). The reception chain noise imbalance may result in a greater noise disparity among the one or more reception chains of the UE 115, which may result in a less reliable phase noise estimation of a relatively weaker reception chain (e.g., more vulnerable to beamforming interference).

For example, the phase noise may be illustrated by Equation 2:

$$y = HPx + n \quad (2)$$

where y may be equal to the phase noise, HP may be equal to an effective channel matrix of the UE 115, x may be equal to precoder values of the channel, and n may be a channel offset. If the effective channel matrix is diagonal, the phase noise associated with the one or more PTRSs may only be based on a single reception chain value, as described in Equation 3 below. The UE 115 estimating phase noise with insufficient reception chain values may result in an inaccurate phase noise estimation and decreased throughput. Additionally, the UE 115 estimating phase noise with insufficient reception chains values may result in varying effective channel values (e.g., single-path static channel values), which may also result in ineffective channel measurements.

For example, the efficient channel for the UE 115 at multiple PTRS ports may be defined by Equation 3:

$$HP = \begin{bmatrix} h0 & 0 \\ 0 & h1 \end{bmatrix} \rightarrow y_{PTRS} = \begin{bmatrix} h0 \\ 0 \end{bmatrix} x_{PTRS} + n \quad (3)$$

where h0 corresponds to a noise value of a first reception chain and h1 corresponds to a noise value of a second reception chain at the UE 115. $Y_{PTRS}$ corresponds to the estimated phase noise at the PTRS ports, where only the first reception chain noise value may be included in the calculation for the estimates phase noise, which may result in inaccurate channel measurements.

Additionally, or alternatively, a network entity 105 and a UE 115 may use channel state information reference signals (CSI-RS) for tracking to estimate properties (e.g., delay-spread, average delay, Doppler-spread, average Doppler shift, channel delay profile, signal-to-noise ratio (SNR)) of the wireless channel used for communications at each reception chain. If the effective channel matrix of DMRS ports is diagonal, a CSI-RS port association with a single DMRS port may result in inaccurate channel measurements at the network entity 105 and the UE 115.

The wireless communications system 100 may support efficient techniques for performing channel measurement procedures by mapping a TRS port to multiple reference signal ports. The UE 115 may use the multiple reference signal ports to estimate the channel, which may result in more accurate channel estimations and noise estimations. For example, the UE 115 may be configured with a mapping between a TRS (e.g., PTRS, CSI-RS for tracking) port and multiple reference signal (e.g., DMRS) ports at the UE 115. In some examples, the UE 115 may receive an indication of the mapping between the TRS port and multiple reference signal ports, and the UE 115 may receive a TRS from a network entity 105 at a TRS port associated with one or more DMRS ports. The UE 115 may measure the TRS at each of the reference signal ports to perform channel estimation procedures (e.g., the UE 115 may determine phase noise error or other channel properties at each reception chain for the channel based on the estimation). In some examples, the mapping may be a fixed or semi-static mapping received from the network entity 105. Additionally, or alternatively, the mapping may be based on a pre-defined codebook configured at the UE 115. For example, the UE 115 may apply precoder values to the TRS ports based on the codebook, and the UE 115 may estimate the channel (e.g., calculate the phase noise error of a reception chain) based on the precoder values. Additionally, or alternatively, the mapping may be based on the structure of the wireless channel. For example, the network entity 105 may determine a precoder value for the TRS ports based on sounding reference signals (SRSs), based on a recommended mapping by the UE 115, or both. The network entity 105 may transmit the precoder values corresponding to the TRS ports using periodic signaling, dynamic signaling, or both.

Figure 2:
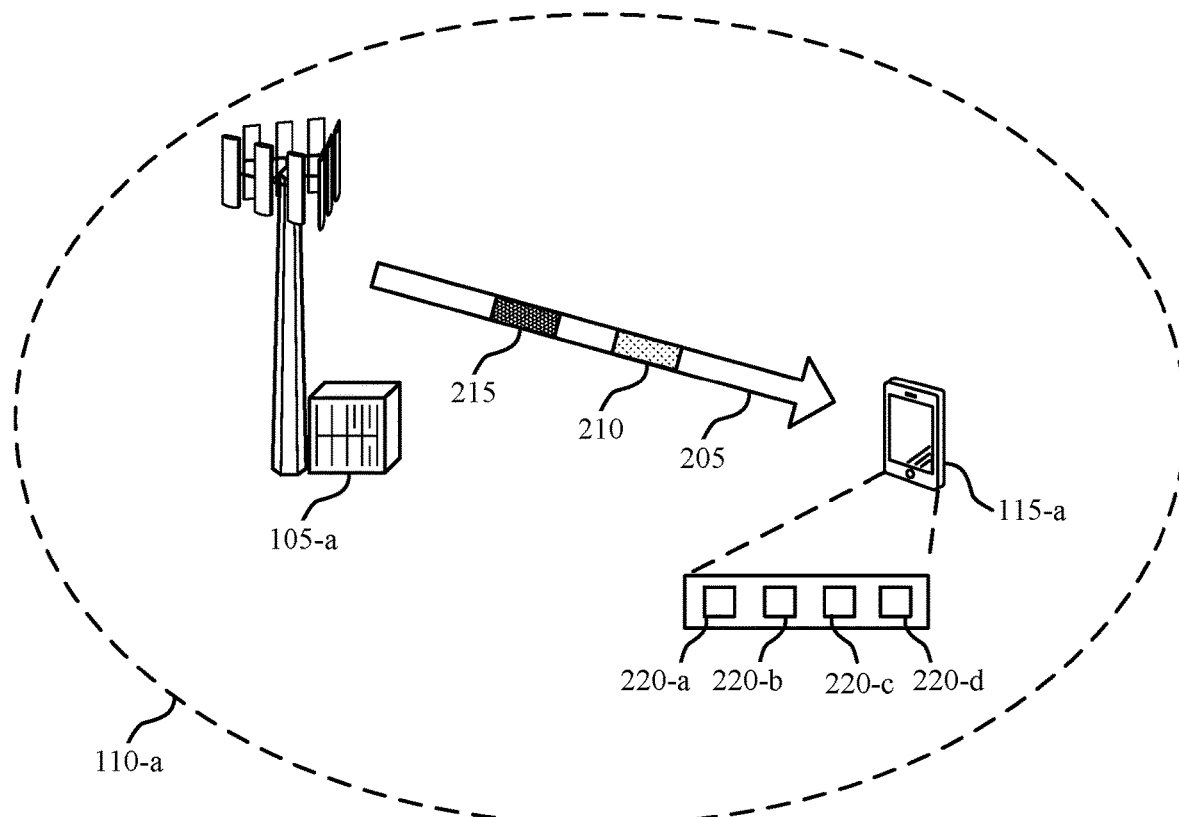
FIG. 2 illustrates an example of a wireless communications system that supports multi-port PTRS port association with multiple DMRS ports in accordance with one or more aspects of the present disclosure.

FIG. 2 illustrates an example of a wireless communications system 200 that supports multi-port PTRS port association with multiple DMRS ports in accordance with one or more aspects of the present disclosure. The wireless communications system 200 may implement or be implemented to realize or facilitate aspects of the wireless communications system 100. For example, the wireless communications system 200 illustrates communication between a UE 115-a and a network entity 105-a via a downlink communication link 205 within a wireless range 110-a. The UE 115-a, the network entity 105-a, and the wireless range 110-a may be examples of corresponding devices illustrated by and described with reference to FIG. 1. In some implementations the UE 115-a and the network entity 105-a may support performing channel measurement procedures by using a mapping between a TRS port and multiple reference signal ports.

The network entity 105-a may use the downlink communication link 205 to transmit signaling to the UE 115-a. For example, the network entity 105 may transmit an indication (e.g., TRS mapping 210) of a mapping between a TRS port and multiple reference signal ports. The mapping may be between a PTRS port and multiple DMRS ports at the UE 115-a or between a CSI-RS for tracking port and multiple CSI-RS ports at the UE 115-a. Additionally, or alternatively, the network entity 105 may transmit a TRS 215 (e.g., a CSI-RS, a TRS, a PTRS) to the UE 115-a for the UE 115-a to perform channel measurement procedures. The UE 115-a may receive the TRS 215 via one or more reception chains 220, such as reception chain 220-a, reception chain 220-b, reception chain 220-c, and reception chain 220-d. The network entity 105-a may transmit the TRS mapping 210 to the UE 115-a explicitly (e.g., through a downlink transmission). For example, the network entity 105-a may transmit the TRS mapping 210 with a signal granularity or periodicity (such as through periodic signaling), dynamic signaling, or both. Dynamic signaling may include transmitting the TRS mapping 210 based on receiving a grant from the UE 115-a or a request from the UE 115-a (which may be referred to as needs-based aperiodic signaling). The aperiodic signaling may be associated with the UE 115-a requesting to perform a timing adjustment for a beam or a precoder value.

In some examples, the TRS mapping 210 may allow for the UE 115-a to perform more accurate channel measurement procedures. The UE 115-a may use the channel measurement procedures to perform a channel estimation of the phase noise level associated with each reception chain 220. The channel estimation may include using an effective channel to calculate an effective channel of a PTRS port (e.g., PTRS port effective channel). The UE 115-a may use the calculation of the PTRS port effective channel to estimate the phase noise level of the reception chains 220. For example, the UE 115-a may use the TRS mapping 210 to determine a phase noise level at each of the reception chains 220 associated with the PTRS signal. The UE 115-a may determine the phase noise level at each reception chain 220 by calculating the PTRS port effective channel, as described by Equation 4:

$$H_{PTRS,nRX \times 1} = H_{eff,nRX \times nLayer} P_{nLayer \times 1} \quad (4)$$

where $H_{eff}$ corresponds to the effective channel at the DMRS ports and $P_{nLayer}$ corresponds to a vector of the precoder values between the DMRS ports and the PTRS port (e.g., the TRS mapping 210). The UE 115-a may be configured with the vector of the precoder values, the UE 115-a may determine the vector of precoder values, or both, which may allow for the UE 115-a to be able to determine the phase noise level at each reception chain 220 (e.g., have a sufficient effective channel for each of the reception chain calculations). For example, the UE 115-a may use multiple reception chain phase noise level values to determine a sufficient effective channel for phase noise compensation. In some examples, the network entity 105-b may transmit the TRS mapping 210 to the UE 115-b as a fixed mapping, a semi-static mapping, or both. For example, the network entity 105-a may transmit an indication of a vector with fixed values for the UE 115-a to perform the calculation of the effective channel of the PTRS, as described by Equation 5:

$$P_{nLayer \times 1} = 1/2 \begin{bmatrix} 1 \\ 1 \\ 1 \\ 1 \end{bmatrix} \quad (5)$$

where the each of the values of the vector may correspond to a precoder value for a respective reception chain 220 at the UE 115-a. For example, each value of the vector may correspond to the four reception chains 220 (e.g., the first vector value may correspond to reception chain 220-a, the second vector value may correspond to reception chain 220-b, the third vector value may correspond to the reception chain 220-c, and the fourth vector value may correspond to the reception chain 220-d. The UE 115-a may use the TRS mapping 210 to calculate the effective channel of the PTRS port and to determine the phase noise level at each of the reception chains 220 associated with the PTRS ports and the DMRS ports. The fixed or semi-static TRS mapping 210 may allow for the UE 115-a to determine noise level at a relatively greater quantity of reception chains 220, which may allow for increased accuracy in the channel measurement procedure.

Additionally, or alternatively, UE 115-a may determine the mapping by using a mapping codebook, which may be preconfigured at the UE 115-a or in accordance with a set of standard operating procedures defined for the UE 115-a. The UE may use the codebook to select a vector of precoder values to perform the calculation. The TRS mapping 210 as a codebook of precoder values may be described in further detail in FIG. 4.

Additionally, or alternatively, the network entity 105-a may transmit an indication of one or more precoder values based on one or more parameters. The UE 115-a may use the one or more precoder values to perform the PTRS port effective channel calculation and channel estimation of the phase noise level at the reception chains 220. The indication of the one or more precoder values may be described in further detail in FIG. 4.

Figure 3:
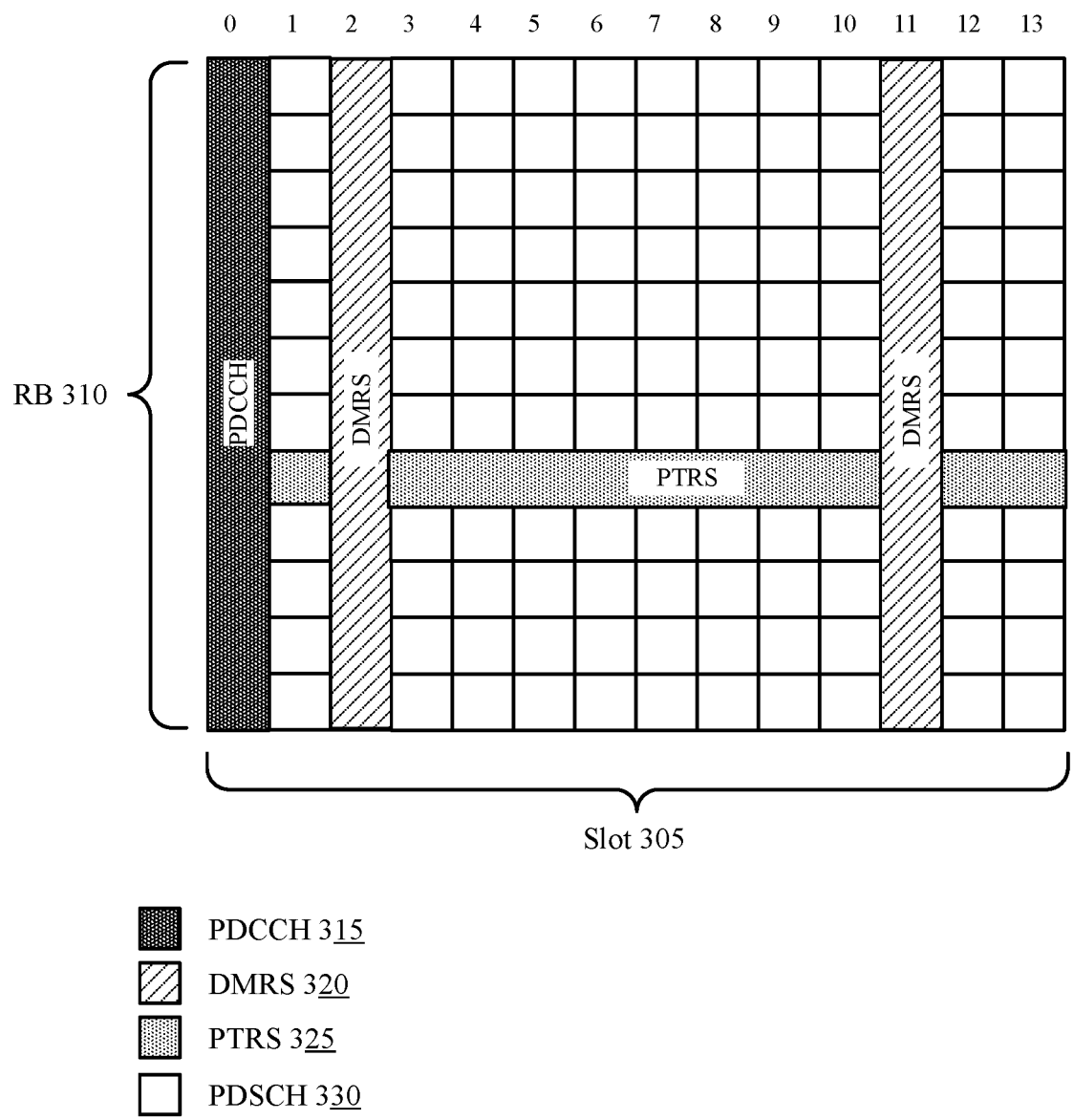
FIG. 3 illustrates an example of a reference signal scheme that supports multi-port PTRS port association with multiple DMRS ports in accordance with one or more aspects of the present disclosure.

FIG. 3 illustrates an example of a reference signal scheme 300 that supports multi-port PTRS port association with multiple DMRS ports in accordance with one or more aspects of the present disclosure. The reference signal scheme 300 may implement or be implemented to realize or facilitate aspects of the wireless communications system 100 and wireless communications system 200. For example, the reference signal scheme 300 illustrates communication between a UE and a network entity using one or more reference signals. The UE and the network entity may be examples of corresponding devices illustrated by and described with reference to FIGS. 1 and 2. In some implementations the UE 115 and the network entity 115 may support performing channel measurement procedures by using a mapping between a TRS port and multiple reference signal ports.

In some examples, a network entity may transmit multiple messages to a UE for the UE to perform channel measurement procedures. For example, the network entity may transmit physical downlink control channel (PDCCH) 315 messages and PDSCH 330 messages carrying data within a RB 310 of a time slot 305. The UE may receive the PDCCH 315 and the PDSCH 330 at one or more reception chains.

However, the one or more reception chains at the UE may be associated with noise, interference, or both, which may affect the reception of the data. The network entity may transmit multiple reference signals to the UE for the UE to perform channel measurements and to improve the reception of the data at the reception chains. The reference signals may be one or more DMRSs 320 and a PTRS 325. In some examples, PTRSs 425 may be allocated across multiple TTIs (e.g., multiple time slots 305). In such examples, the UE may use the PTRSs 425 to identify and to compensate for the phase noise. Thus, the UE may compensate for the phase jumps or phase noise using the PTRSs 325, may perform channel estimation using the DMRSs 320, and may then demodulate the PDSCH 330 based thereon. In some examples, the UE may transmit the DMRSs 420 with different densities across different TTIs (e.g., DMRS bundling). In some examples, the UE may transmit PTRSs 425 across multiple TTIs (e.g., within a time domain window).

In some examples, PTRS 425 may be mapped to a single DMRS 420 (e.g., may be located in the same slot 405). For instance, the network entity may schedule the PTRS 425 and the DMRS 420 in a same slot 405. In this example, the UE may use a PTRS port and a DMRS port at the UE to perform the channel measurement procedures. However, the one-to-one mapping may result in less accurate channel measurements, such that the UE may not be able to compensate for phase noise using the PTRS 325. As such, the UE may receive an indication of a mapping from the network entity, where the mapping may be between a PTRS 425 and multiple DMRSs 420. The mapping may further map a PTRS port to multiple DMRS ports. The UE 115 may use the multiple DMRS ports to estimate the channel, which may result in more accurate channel estimations and noise estimations.

Figure 4:
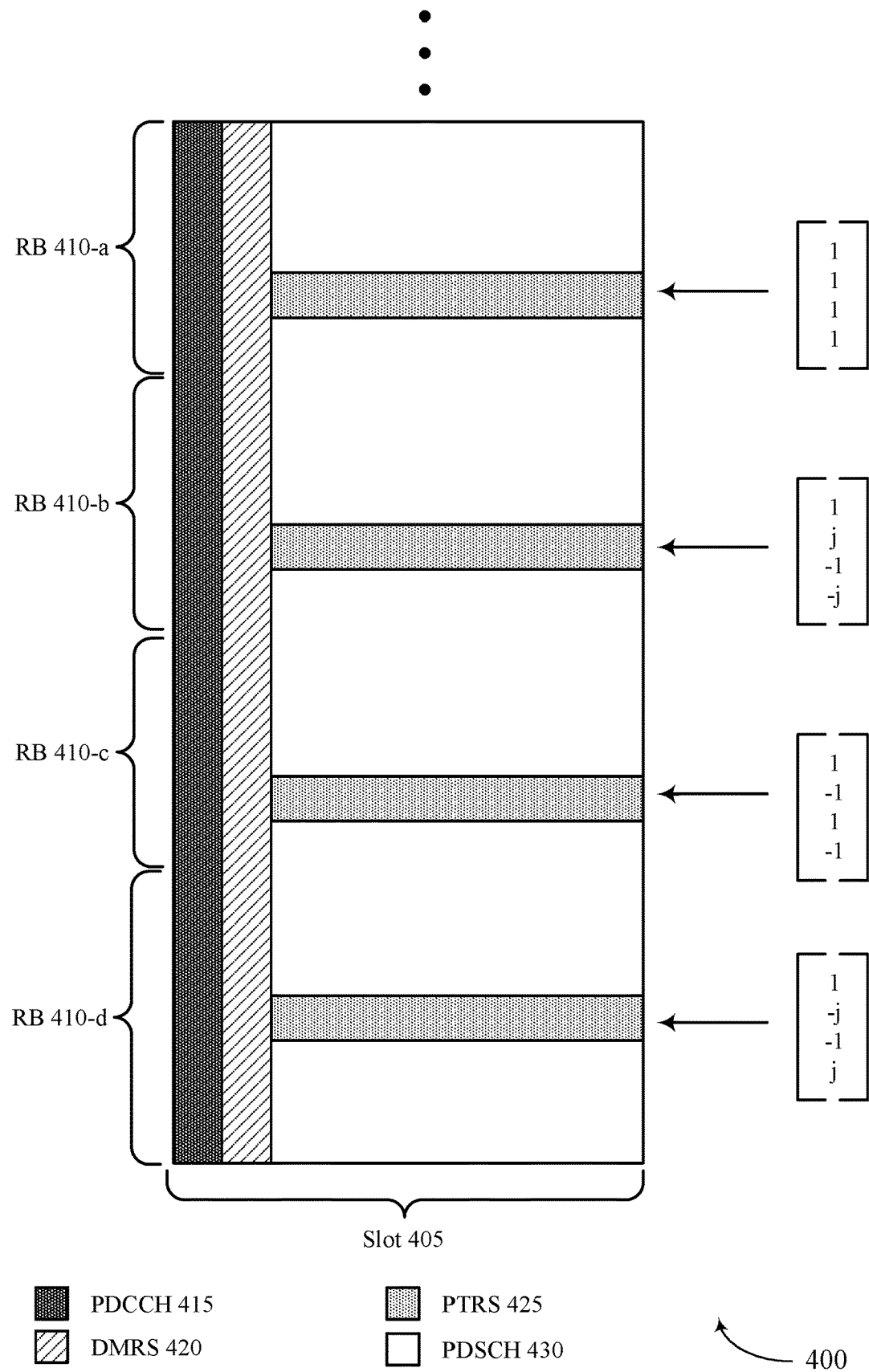
FIG. 4 illustrates an example of an antenna port mapping scheme that supports multi-port PTRS port association with multiple DMRS ports in accordance with one or more aspects of the present disclosure.

FIG. 4 illustrates an example of an antenna port mapping scheme 400 that supports multi-port PTRS port association with multiple DMRS ports in accordance with one or more aspects of the present disclosure. The antenna port mapping scheme 400 may implement or be implemented to realize or facilitate aspects of the wireless communications system 100 and wireless communications system 200. For example, the antenna port mapping scheme 400 illustrates communication between a UE and a network entity using one or more reference signals. The UE and the network entity may be examples of corresponding devices illustrated by and described with reference to FIGS. 1 and 2. In some implementations the UE 115 and the network entity 115 may support performing channel measurement procedures by using a mapping between a TRS port and multiple reference signal ports.

In some examples, a network entity may transmit multiple messages to a UE for the UE to perform channel measurement procedures. For example, the network entity may transmit PDCCH 415 messages and PDSCH 430 messages carrying data within an RB 410 of a time slot (e.g., slot 405). The UE may receive the PDCCH 415 and the PDSCH 430 at one or more reception chains. However, the one or more reception chains at the UE may be associated with noise, interference, or both, which may affect the reception of the data. The UE may use a mapping between a PTRS 425 and multiple DMRSs 420 corresponding to a PTRS port and multiple DMRS ports to perform more accurate channel measurement procedures.

In some examples, the UE may determine the mapping between the PTRS port and multiple DMRS ports by using a predefined mapping codebook. The codebook may include multiple vectors with precoder values for the UE to determine phase noise level for one or more reception chains (e.g., without explicit signaling from the network entity). For example, the UE may be pre-configured with a cyclic-shift codebook, where the UE may assign each of the vectors of the codebook to one or more PTRSs 425 within the slot 405. The cyclic shift codebook may be described by Equation 7:

$$\left( \begin{bmatrix} 1 \\ 1 \\ 1 \\ 1 \end{bmatrix}, \begin{bmatrix} 1 \\ j \\ -1 \\ -j \end{bmatrix}, \begin{bmatrix} 1 \\ -1 \\ 1 \\ -1 \end{bmatrix}, \begin{bmatrix} 1 \\ -j \\ -1 \\ j \end{bmatrix} \right) \quad (7)$$

where each vector of the matrix corresponds to a PTRS in each of the RBs 410.

For example, the UE 115 may use the cyclic shift codebook to assign (e.g., circulate) a vector of precoder values to or more PTRSs 425 (e.g., PTRS tones). For example, the UE 115 may assign the first vector to the PTRS 425 included in the RB 410-a, the second vector to the PTRS 425 included in the RB 410-b, the third vector to the PTRS 425 included in the RB 410-c, and the fourth vector to the PTRS 425 included in the RB 410-d. The UE 115 may use each vector in the PTRS port effective channel calculation described in formula 4 of FIG. 2. The UE 115 may be able to determine a PTRS port effective channel for each of the reception chains and PTRSs 425, which may increase the accuracy of the phase noise estimation.

Additionally, or alternatively, the network entity may transmit an indication of one or more precoder values for the UE to perform the phase noise estimation. For example, the network entity may determine a precoder based on channel-side information available at the network entity. The network entity may use the structure of the effective channel, SRS measurements (e.g., based on channel reciprocity), or a recommended mapping from the UE to determine the one or more precoder values. The UE may transmit the recommended mapping to the network entity via a CSI report or a need based report (e.g., a request). The one or more precoder values may be based on a codebook at the network entity. In some examples, the one or more precoder values may be non-codebook based, and the network entity may determine the one or more precoder values using phase and amplitude quantization techniques. The network entity may transmit the precoder values to the UE via downlink signaling (e.g., RRC signaling), and the precoder values may be assigned to the PTRSs 425 for each RB 410, each sub-band, or for the entire bandwidth.

Figure 5:
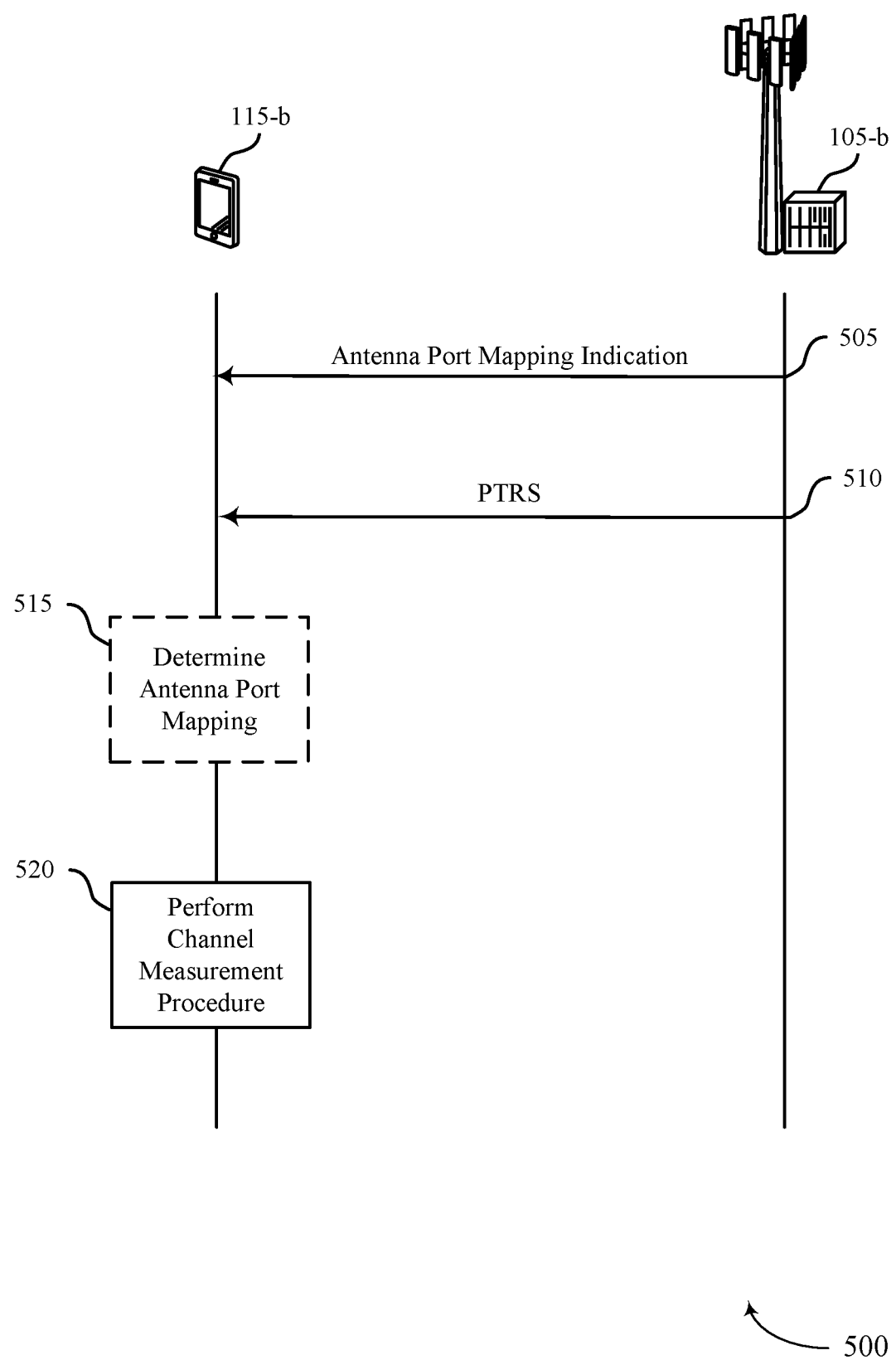
FIG. 5 illustrates an example of a process flow that supports multi-port PTRS port association with multiple DMRS ports in accordance with one or more aspects of the present disclosure.

FIG. 5 illustrates an example of a process flow 500 that supports multi-port PTRS port association with multiple DMRS ports in accordance with one or more aspects of the present disclosure. The process flow 500 may implement or be implemented by aspects of the wireless communications systems 100 or 200. For example, process flow 500 may be implemented by UE 115-b and network entity 105-b, which may each represent examples of a UE 115 and a network entity 105 described with reference to FIGS. 1 through 4.

In the following description of the process flow 500, the operations may be performed in a different order than the order shown, or the operations performed by the example devices may be performed in different orders or at different times. For example, specific operations may also be left out of the process flow 500, or other operations may be added to the process flow 500. Although UE 115-b and network entity 105-b are shown performing the operations of the process flow 500, some aspects of some operations may also be performed by one or more other wireless devices.

At 505, the network entity 105-b may transmit an indication of an antenna port mapping between a tracking reference signal (e.g., PTRS or CSI-RS for tracking) and a corresponding reference signal (e.g., DMRS) to the UE 115-b. For a PTRS, the UE 115-b may use the antenna port mapping to perform channel measurement procedures. Additionally, or alternatively, for a CSI-RS for tracking, the UE 115-b may use the antenna port mapping to perform the channel measurement procedures, or the UE 115-b may refrain from using the antenna port mapping to perform the channel measurement procedures. In this example, the UE 115-b using the antenna port mapping to perform the channel measurement procedures may result in more accurate measurements and more efficient use of resources.

The antenna port mapping may indicate a mapping of a tracking reference signal antenna port (e.g., TRS port or PTRS port) to multiple reference signal antenna ports (e.g., DMRS ports) associated with the corresponding reference signal. In some examples, the network entity 105-b may transmit the indication of the antenna port mapping as a fixed mapping, a semi-static mapping, or both, where the antenna port mapping is based on a vector of respective parameters for each of one or more reception chains at the UE 115. In some examples, the network entity 105-b may transmit the indication of the antenna port mapping as a codebook of precoder values. In some examples, the network entity 105-b may transmit the indication of the antenna port mapping via periodic signaling, aperiodic signaling, or both.

In some examples, the network entity 105-b may transmit an indication of a precoder value associated with the antenna port mapping to the UE 115-b. The precoder value may be based on one or more of a structure of an effective channel of the tracking reference signal antenna port, a sounding reference signal, a channel state information report.

At 510, the network entity 105-b may transmit a tracking reference signal to the UE 115-b based on the mapping. In some examples, the UE 115-b may receive the tracking reference signal via multiple reception chains at the UE 115-b. In some examples, the tracking reference signal may be a phase tracking reference signal and the multiple reference signals may be multiple demodulation reference signals. In some examples, the network entity 105-b may transmit the multiple demodulation reference signals to the UE 115, where the multiple reference signal antenna ports may be multiple demodulation reference signal antenna ports.

In some examples, the tracking reference signal may be channel state information reference signal for tracking. The network entity 105-b may transmit multiple demodulation reference signals via the multiple demodulation signal antenna ports. The multiple reference signal antenna ports may be multiple demodulation reference signal antenna ports.

At 515, in some examples, the UE 115-b may determine the antenna port mapping based on both an effective channel associated with multiple reference signal antenna ports and an effective channel associated with the tracking reference signal antenna port.

At 520, the UE 115-b may perform a channel measurement procedure using the tracking reference signal based on the mapping of the tracking reference signal antenna port to the multiple reference signal antenna ports. In some examples, the UE 115-b may determine a respective channel parameter for each of the plurality of reception chains. In some examples, the UE 115-b may perform the channel measurement procedure using the phase tracking reference signal, where the channel measurement procedure may be a phase noise estimation procedure. In some examples, the UE 115-b may perform the channel measurement procedure using the tracking reference signal, where the channel measurement procedure is a channel estimation procedure.

Figure 6:
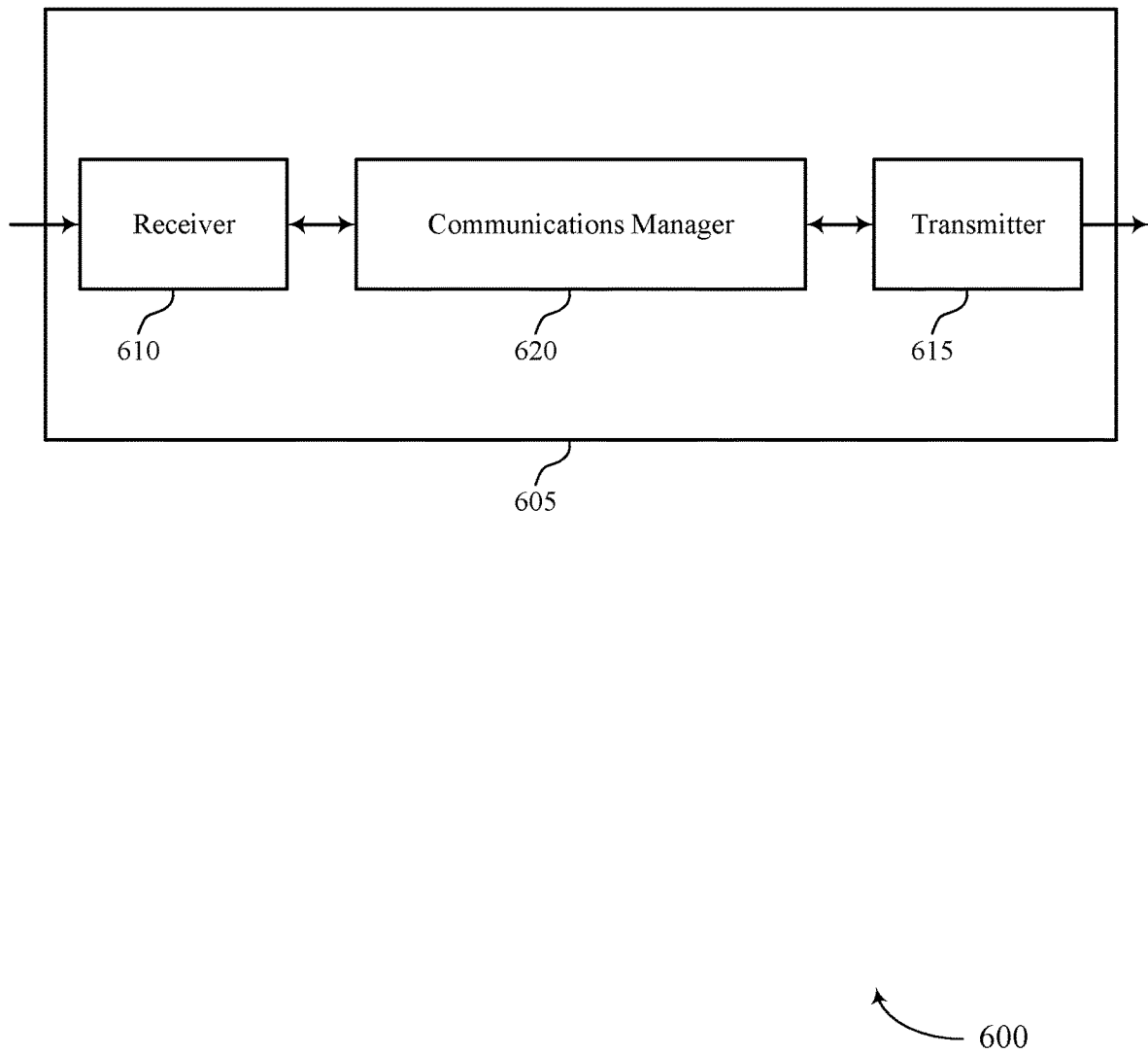
FIGS. 6 and 7 show block diagrams of devices that support multi-port PTRS port association with multiple DMRS ports in accordance with one or more aspects of the present disclosure.

FIG. 6 shows a block diagram 600 of a device 605 that supports multi-port PTRS port association with multiple DMRS ports in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-port PTRS port association with multiple DMRS ports). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-port PTRS port association with multiple DMRS ports). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of multi-port PTRS port association with multiple DMRS ports as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The communications manager 620 may be configured as or otherwise support a means for receiving the tracking reference signal via the tracking reference signal antenna port based on the antenna port mapping between the tracking reference signal and the corresponding reference signal. The communications manager 620 may be configured as or otherwise support a means for performing a channel measurement procedure using the tracking reference signal based on the mapping of the tracking reference signal antenna port to the set of multiple reference signal antenna ports.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources. For example, by performing channel estimation procedures using multiple PTRS ports and multiple DMRS ports, the processor of the device 605 may estimate the channel with greater accuracy and with increased efficiency.

Figure 7:
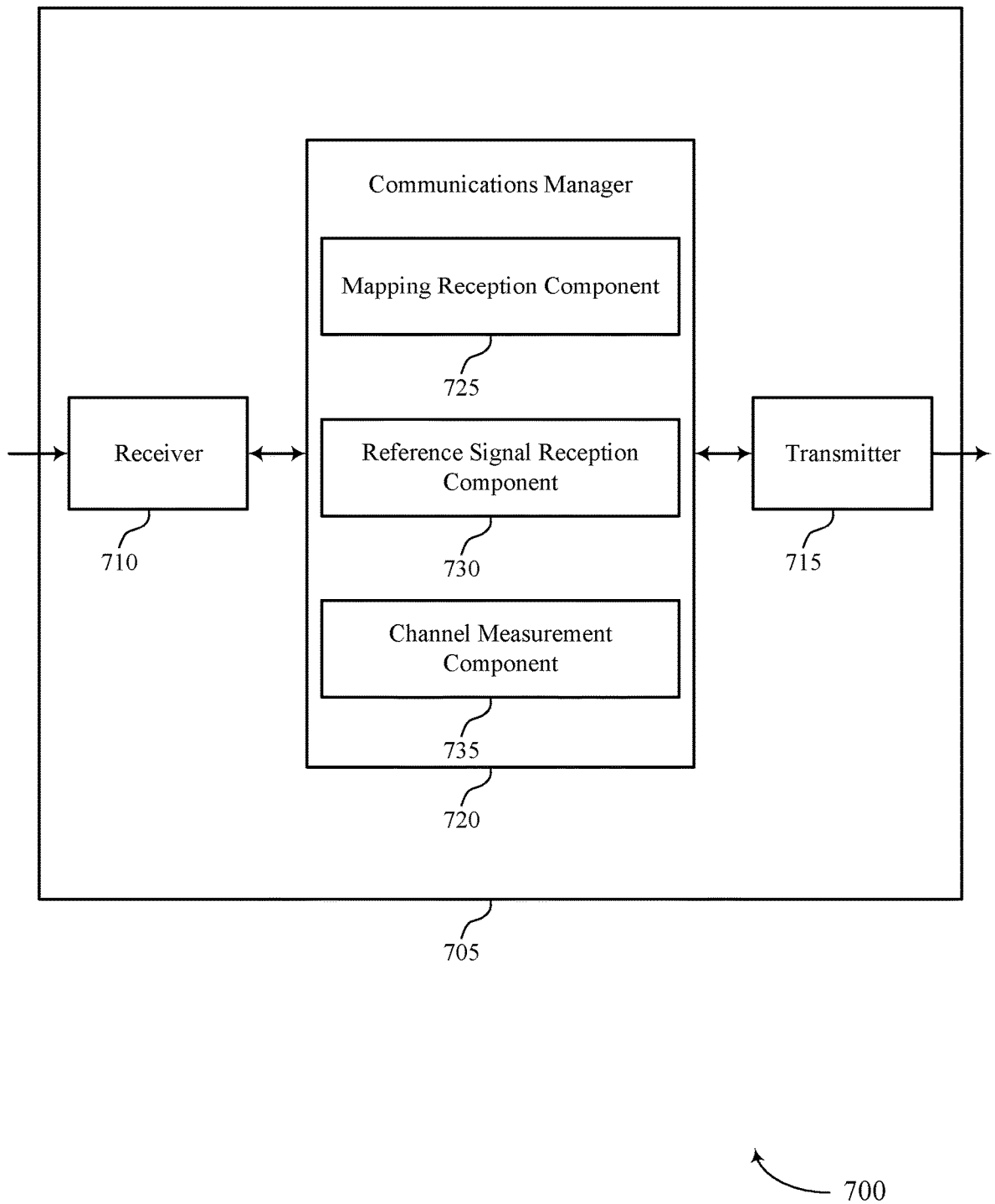

FIG. 7 shows a block diagram 700 of a device 705 that supports multi-port PTRS port association with multiple DMRS ports in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-port PTRS port association with multiple DMRS ports). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-port PTRS port association with multiple DMRS ports). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of multi-port PTRS port association with multiple DMRS ports as described herein. For example, the communications manager 720 may include a mapping reception component 725, a reference signal reception component 730, a channel measurement component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The mapping reception component 725 may be configured as or otherwise support a means for receiving an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The reference signal reception component 730 may be configured as or otherwise support a means for receiving the tracking reference signal via the tracking reference signal antenna port based on the antenna port mapping between the tracking reference signal and the corresponding reference signal. The channel measurement component 735 may be configured as or otherwise support a means for performing a channel measurement procedure using the tracking reference signal based on the mapping of the tracking reference signal antenna port to the set of multiple reference signal antenna ports.

Figure 8:
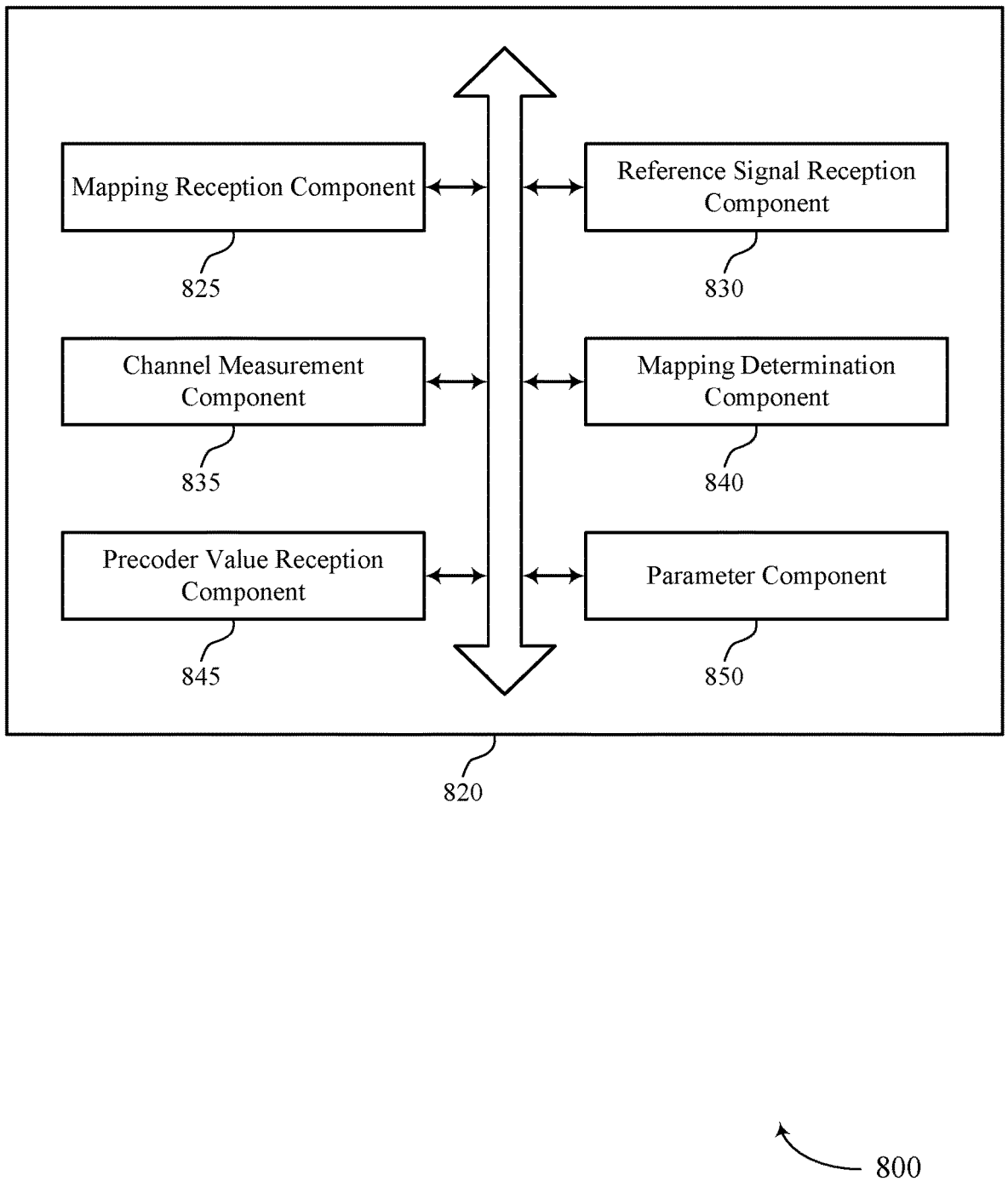
FIG. 8 shows a block diagram of a communications manager that supports multi-port PTRS port association with multiple DMRS ports in accordance with one or more aspects of the present disclosure.

FIG. 8 shows a block diagram 800 of a communications manager 820 that supports multi-port PTRS port association with multiple DMRS ports in accordance with one or more aspects of the present disclosure. The communications manager 820 may be an example of aspects of a communications manager 620, a communications manager 720, or both, as described herein. The communications manager 820, or various components thereof, may be an example of means for performing various aspects of multi-port PTRS port association with multiple DMRS ports as described herein. For example, the communications manager 820 may include a mapping reception component 825, a reference signal reception component 830, a channel measurement component 835, a mapping determination component 840, a precoder value reception component 845, a parameter component 850, or any combination thereof. Each of these components may communicate, directly or indirectly, with one another (e.g., via one or more buses).

The communications manager 820 may support wireless communication at a UE in accordance with examples as disclosed herein. The mapping reception component 825 may be configured as or otherwise support a means for receiving an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The reference signal reception component 830 may be configured as or otherwise support a means for receiving the tracking reference signal via the tracking reference signal antenna port based on the antenna port mapping between the tracking reference signal and the corresponding reference signal. The channel measurement component 835 may be configured as or otherwise support a means for performing a channel measurement procedure using the tracking reference signal based on the mapping of the tracking reference signal antenna port to the set of multiple reference signal antenna ports.

In some examples, to support receiving the tracking reference signal, the reference signal reception component 830 may be configured as or otherwise support a means for receiving the tracking reference signal via a set of multiple reception chains at the UE.

In some examples, to support performing the channel measurement procedure using the tracking reference signal, the channel measurement component 835 may be configured as or otherwise support a means for performing a channel estimation using the set of multiple reception chains based on the tracking reference signal and the antenna port mapping of the tracking reference signal antenna port to the set of multiple reference signal antenna ports. The channel estimation may include a signal-to-noise ratio, a channel correlation value in frequency domain, a channel correlation value in time domain, a delay spread, a Doppler spread, Doppler shifts, a channel power delay profile, or any combination thereof.

In some examples, to support performing the channel estimation using the set of multiple reception chains, the parameter component 850 may be configured as or otherwise support a means for determining a respective parameter for each of the set of multiple reception chains.

In some examples, the mapping determination component 840 may be configured as or otherwise support a means for determining the antenna port mapping based on an effective channel associated with the set of multiple reference signal antenna ports and an effective channel associated with the tracking reference signal antenna port.

In some examples, to support receiving the indication of the antenna port mapping, the mapping reception component 825 may be configured as or otherwise support a means for receiving the indication of the antenna port mapping as a fixed mapping, a semi-static mapping, or both, where the antenna port mapping is based on a vector of respective parameters for each of one or more reception chains.

In some examples, to support receiving the indication of the antenna port mapping, the mapping reception component 825 may be configured as or otherwise support a means for receiving the indication of the antenna port mapping, where the antenna port mapping is based on a codebook of precoder values.

In some examples, to support determining the antenna port mapping, the mapping reception component 825 may be configured as or otherwise support a means for receiving the indication of the antenna port mapping via periodic signaling, aperiodic signaling, or a combination thereof.

In some examples, to support receiving the indication of the antenna port mapping, the precoder value reception component 845 may be configured as or otherwise support a means for receiving an indication of a precoder value associated with the antenna port mapping, where the precoder value is based on a structure of an effective channel of the tracking reference signal antenna port, a sounding reference signal, a channel state information report, or a combination thereof.

In some examples, the tracking reference signal includes a phase tracking reference signal.

In some examples, the corresponding reference signal includes a demodulation reference signal, and the reference signal reception component 830 may be configured as or otherwise support a means for receiving a set of multiple demodulation reference signals via a set of multiple demodulation reference signal antenna ports, where the set of multiple reference signal antenna ports includes the set of multiple demodulation reference signal antenna ports. In some examples, the corresponding reference signal includes a demodulation reference signal, and the channel measurement component 835 may be configured as or otherwise support a means for performing the channel measurement procedure using the phase tracking reference signal, where the channel measurement procedure includes performing a channel noise error estimation using a set of multiple reception chains associated with a phase tracking reference signal antenna ports, where the channel noise error estimation comprises a phase noise error estimation, a residual frequency error estimation, or both.

In some examples, the tracking reference signal is a channel state information reference signal for tracking.

In some examples, the corresponding reference signal includes a demodulation reference signal, and the reference signal reception component 830 may be configured as or otherwise support a means for receiving a set of multiple demodulation reference signals via the set of multiple demodulation reference signal antenna ports. The multiple reference signal antenna ports may be multiple demodulation reference signal antenna ports. In some examples, the corresponding reference signal includes a channel state information reference signal, and the channel measurement component 835 may be configured as or otherwise support a means for performing the channel measurement procedure using the tracking reference signal, where the channel measurement procedure includes performing a channel estimation using a set of multiple reception chains associated with the set of multiple demodulation reference signal antenna ports. The channel estimation may include a signal-to-noise ratio, a channel correlation value in frequency domain, a channel correlation value in time domain, a delay spread, a Doppler spread, Doppler shifts, a channel power delay profile, or any combination thereof.

Figure 9:
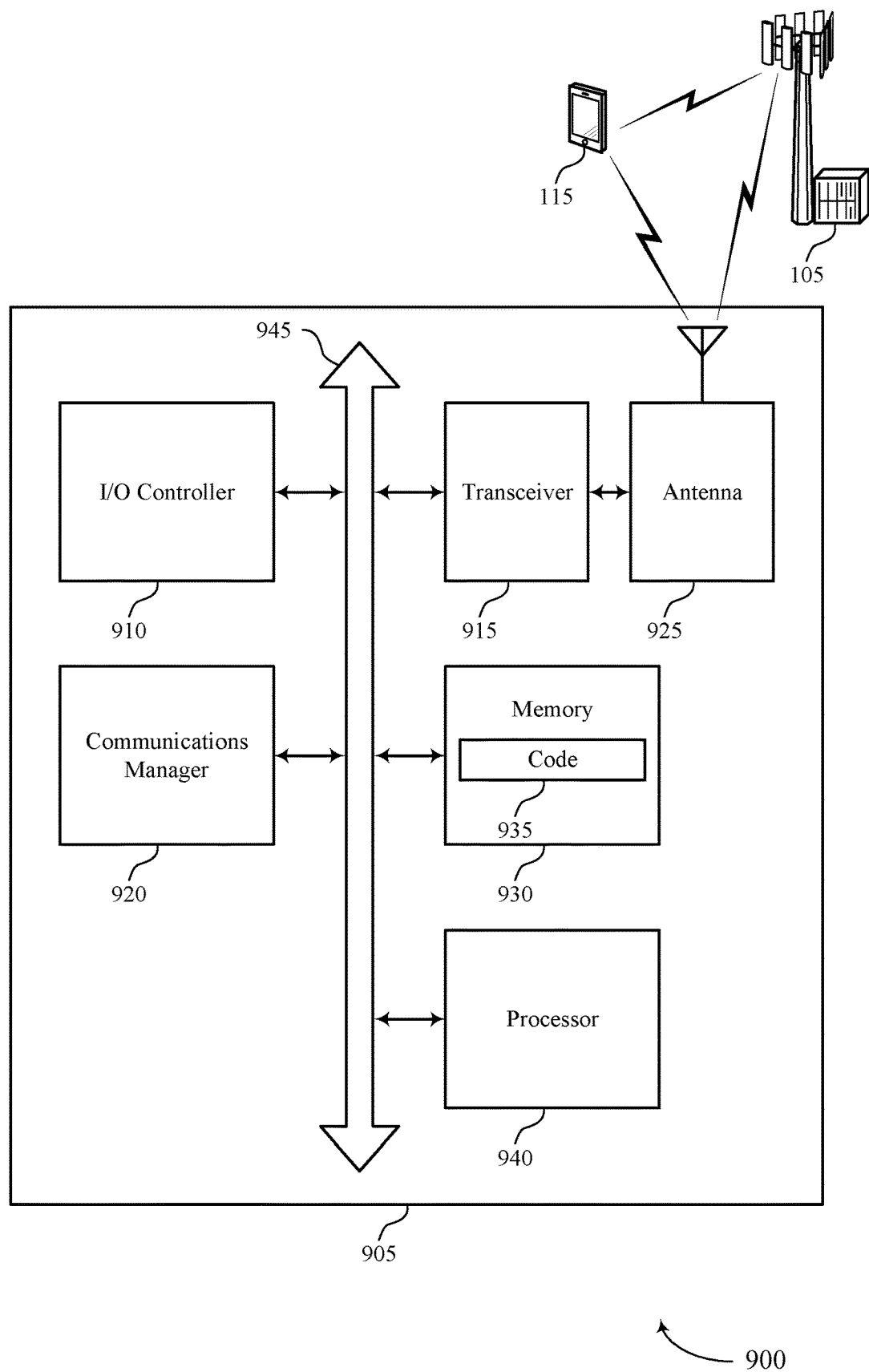
FIG. 9 shows a diagram of a system including a device that supports multi-port PTRS port association with multiple DMRS ports in accordance with one or more aspects of the present disclosure.

FIG. 9 shows a diagram of a system 900 including a device 905 that supports multi-port PTRS port association with multiple DMRS ports in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting multi-port PTRS port association with multiple DMRS ports). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The communications manager 920 may be configured as or otherwise support a means for receiving the tracking reference signal via the tracking reference signal antenna port based on the antenna port mapping between the tracking reference signal and the corresponding reference signal. The communications manager 920 may be configured as or otherwise support a means for performing a channel measurement procedure using the tracking reference signal based on the mapping of the tracking reference signal antenna port to the set of multiple reference signal antenna ports.

By including or configuring the communications manager 920 in accordance with examples as described herein, the device 905 may support techniques for communication reliability, reduced latency, and more efficient utilization of communication resources. For example, by performing multiple reception chain channel estimations using multiple PTRS ports, the processor of the device 905 may more accurately estimate the channel measurements, and the processor of the device 905 may more effectively communicate with other devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of multi-port PTRS port association with multiple DMRS ports as described herein, or the processor 940 and the memory 930 may be otherwise configured to perform or support such operations.

Figure 10:
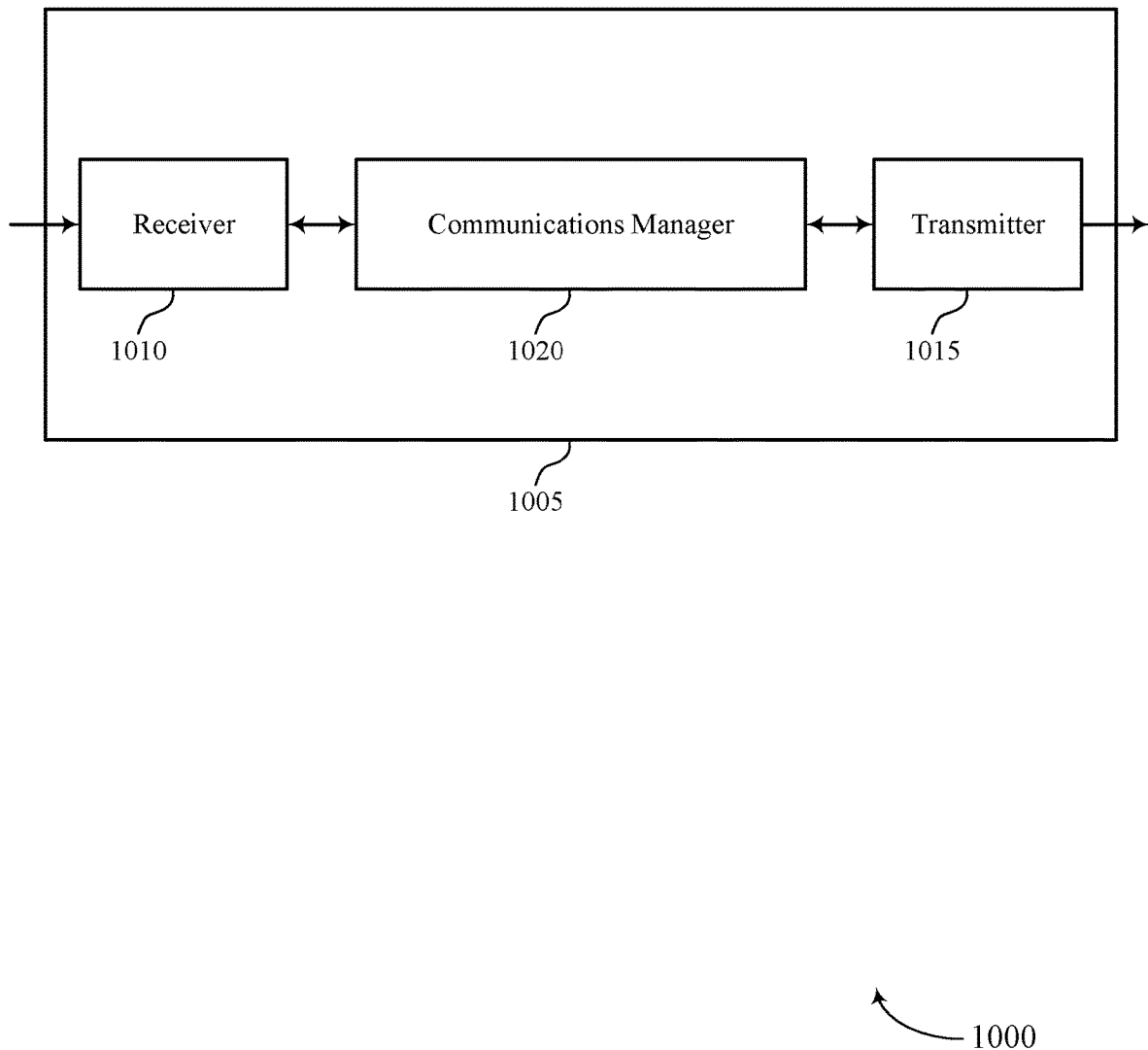
FIGS. 10 and 11 show block diagrams of devices that support multi-port PTRS port association with multiple DMRS ports in accordance with one or more aspects of the present disclosure.

FIG. 10 shows a block diagram 1000 of a device 1005 that supports multi-port PTRS port association with multiple DMRS ports in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of multi-port PTRS port association with multiple DMRS ports as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, to a UE, an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The communications manager 1020 may be configured as or otherwise support a means for transmitting the tracking reference signal.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources. For example, by performing channel estimation procedures using multiple PTRS ports and multiple DMRS ports, the processor of the device 1005 may estimate the channel with greater accuracy and with increased efficiency. The channel estimation procedures may include a signal-to-noise ratio, a channel correlation value in frequency domain, a channel correlation value in time domain, a delay spread, a Doppler spread, Doppler shifts, a channel power delay profile, or any combination thereof.

Figure 11:
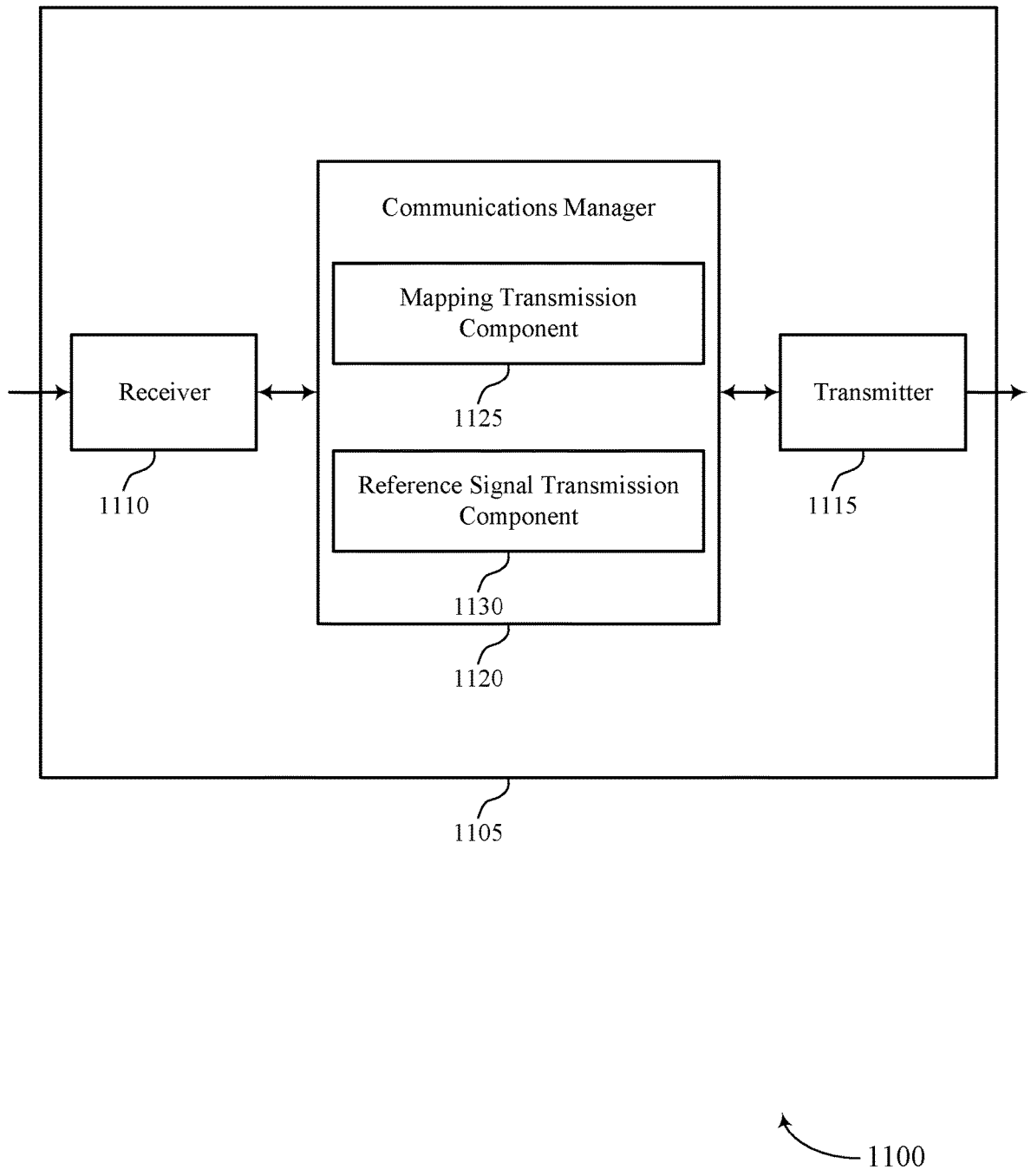

FIG. 11 shows a block diagram 1100 of a device 1105 that supports multi-port PTRS port association with multiple DMRS ports in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of multi-port PTRS port association with multiple DMRS ports as described herein. For example, the communications manager 1120 may include a mapping transmission component 1125 a reference signal transmission component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The mapping transmission component 1125 may be configured as or otherwise support a means for transmitting, to a UE, an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The reference signal transmission component 1130 may be configured as or otherwise support a means for transmitting the tracking reference signal.

Figure 12:
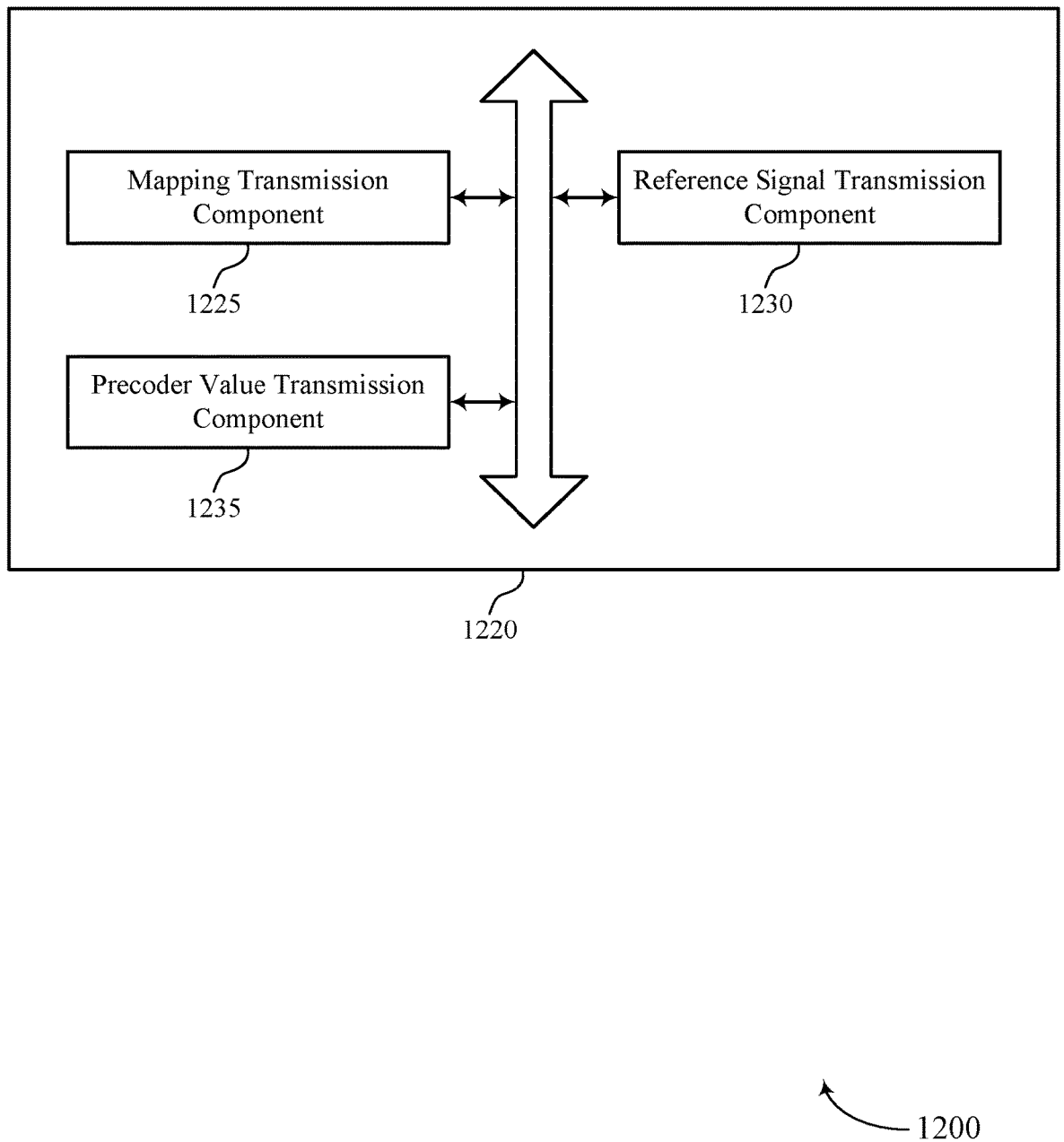
FIG. 12 shows a block diagram of a communications manager that supports multi-port PTRS port association with multiple DMRS ports in accordance with one or more aspects of the present disclosure.

FIG. 12 shows a block diagram 1200 of a communications manager 1220 that supports multi-port PTRS port association with multiple DMRS ports in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of multi-port PTRS port association with multiple DMRS ports as described herein. For example, the communications manager 1220 may include a mapping transmission component 1225, a reference signal transmission component 1230, a precoder value transmission component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The mapping transmission component 1225 may be configured as or otherwise support a means for transmitting, to a UE, an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The reference signal transmission component 1230 may be configured as or otherwise support a means for transmitting the tracking reference signal.

In some examples, to support transmitting the indication of the antenna port mapping, the mapping transmission component 1225 may be configured as or otherwise support a means for transmitting the indication of the antenna port mapping as a fixed mapping, a semi-static mapping, or both, and where the antenna port mapping is based on a vector of respective parameters for each of a set of multiple reception chains.

In some examples, to support transmitting the indication of the antenna port mapping, the mapping transmission component 1225 may be configured as or otherwise support a means for transmitting the indication of the antenna port mapping, where the antenna port mapping is based on a codebook of precoder values.

In some examples, to support transmitting the indication of the antenna port mapping, the precoder value transmission component 1235 may be configured as or otherwise support a means for transmitting an indication of a precoder value associated with the antenna port mapping, where the precoder value is based on a structure of an effective channel of the tracking reference signal antenna port, a sounding reference signal, a channel state information report, or a combination thereof.

In some examples, the tracking reference signal includes a phase tracking reference signal.

In some examples, the corresponding reference signal includes a demodulation reference signal, and the reference signal transmission component 1230 may be configured as or otherwise support a means for transmitting a set of multiple demodulation reference signals via a set of multiple demodulation reference signal antenna ports, where the set of multiple reference signal antenna ports includes the set of multiple demodulation reference signal antenna ports.

In some examples, the tracking reference signal is a channel state information reference signal for tracking.

In some examples, the corresponding reference signal includes a demodulation reference signal, and the reference signal transmission component 1230 may be configured as or otherwise support a means for transmitting a set of multiple demodulation reference signals via the set of multiple demodulation reference signal antenna ports. The multiple reference signal antenna ports may be multiple demodulation reference signal antenna ports.

Figure 13:
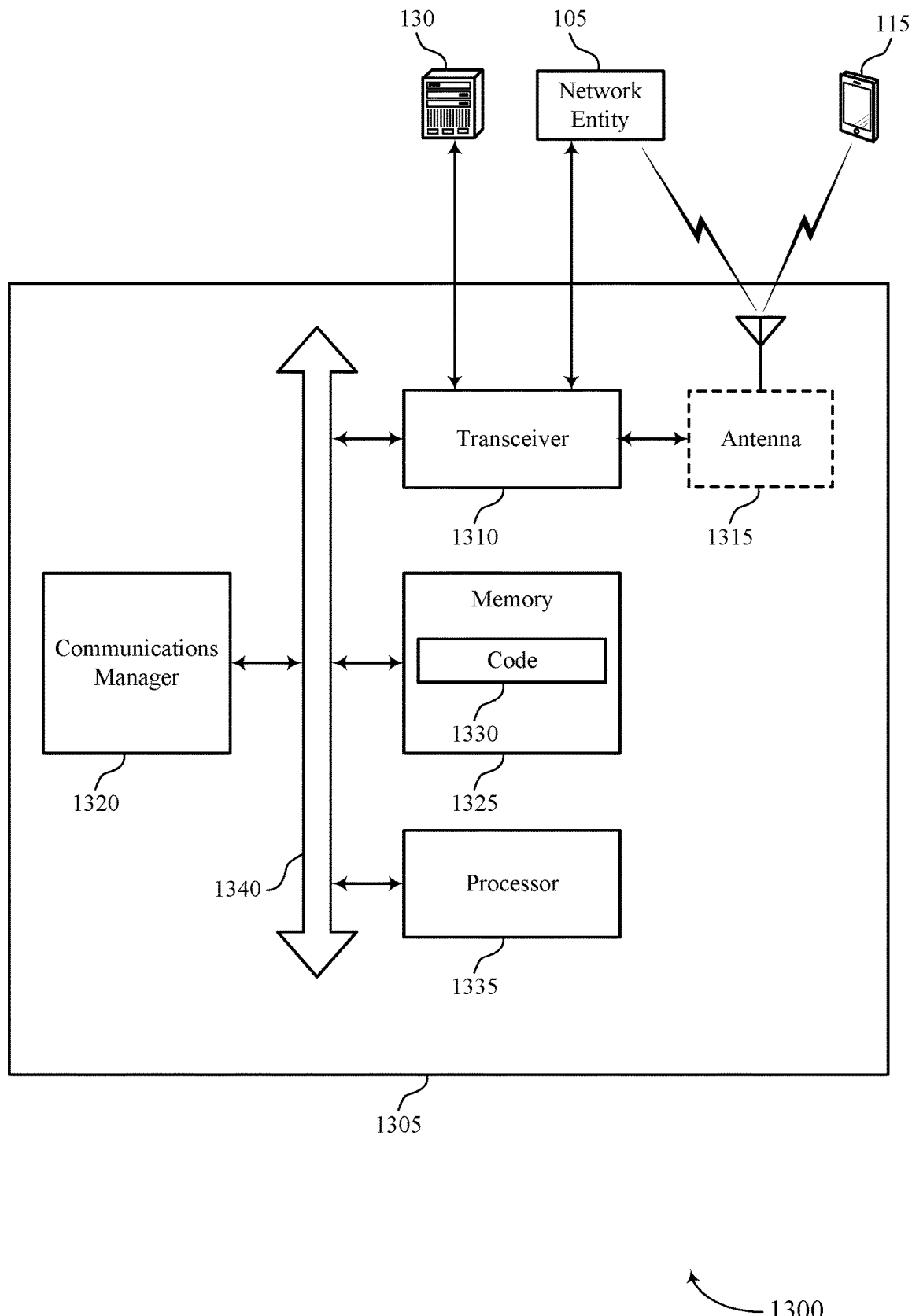
FIG. 13 shows a diagram of a system including a device that supports multi-port PTRS port association with multiple DMRS ports in accordance with one or more aspects of the present disclosure.

FIG. 13 shows a diagram of a system 1300 including a device 1305 that supports multi-port PTRS port association with multiple DMRS ports in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting multi-port PTRS port association with multiple DMRS ports). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links).

For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE, an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The communications manager 1320 may be configured as or otherwise support a means for transmitting the tracking reference signal.

By including or configuring the communications manager 1320 in accordance with examples as described herein, the device 1305 may support techniques for communication reliability, reduced latency, and more efficient utilization of communication resources. For example, by performing multiple reception chain channel estimations using multiple PTRS ports, the processor of the device 1305 may more accurately estimate the channel measurements, and the processor of the device 1305 may more effectively communicate with other devices. The channel estimation procedures may include a signal-to-noise ratio, a channel correlation value in frequency domain, a channel correlation value in time domain, a delay spread, a Doppler spread, Doppler shifts, a channel power delay profile, or any combination thereof.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of multi-port PTRS port association with multiple DMRS ports as described herein, or the processor 1335 and the memory 1325 may be otherwise configured to perform or support such operations.

Figure 14:
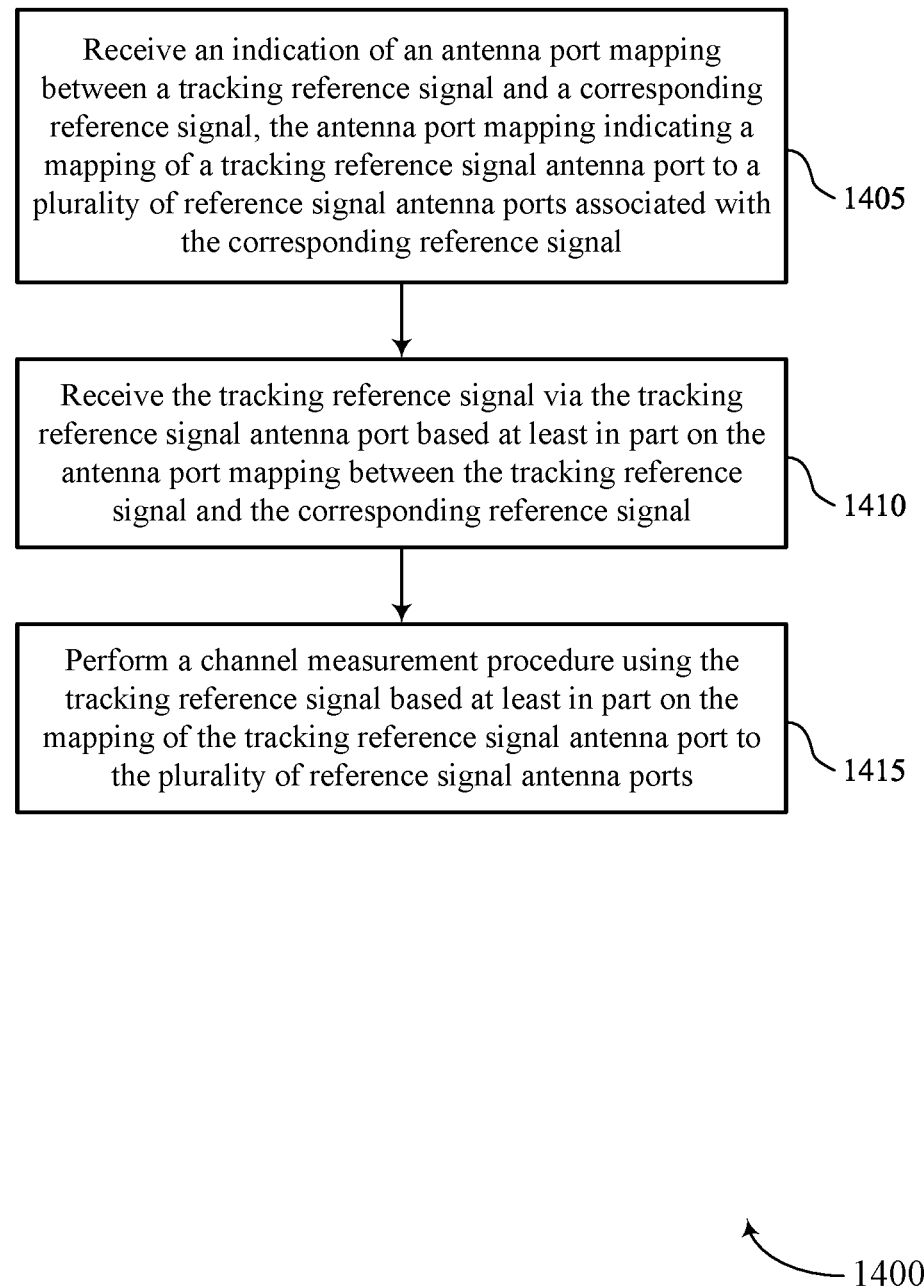
FIGS. 14 through 17 show flowcharts illustrating methods that support multi-port PTRS port association with multiple DMRS ports in accordance with one or more aspects of the present disclosure.

FIG. 14 shows a flowchart illustrating a method 1400 that supports multi-port PTRS port association with multiple DMRS ports in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The operations of 1405 may be performed in accordance with examples as disclosed herein. In some examples, aspects of the operations of 1405 may be performed by a mapping reception component 825 as described with reference to FIG. 8.

At 1410, the method may include receiving the tracking reference signal via the tracking reference signal antenna port based on the antenna port mapping between the tracking reference signal and the corresponding reference signal. The operations of 1410 may be performed in accordance with examples as disclosed herein. In some examples, aspects of the operations of 1410 may be performed by a reference signal reception component 830 as described with reference to FIG. 8.

At 1415, the method may include performing a channel measurement procedure using the tracking reference signal based on the mapping of the tracking reference signal antenna port to the set of multiple reference signal antenna ports. The operations of 1415 may be performed in accordance with examples as disclosed herein. In some examples, aspects of the operations of 1415 may be performed by a channel measurement component 835 as described with reference to FIG. 8.

Figure 15:
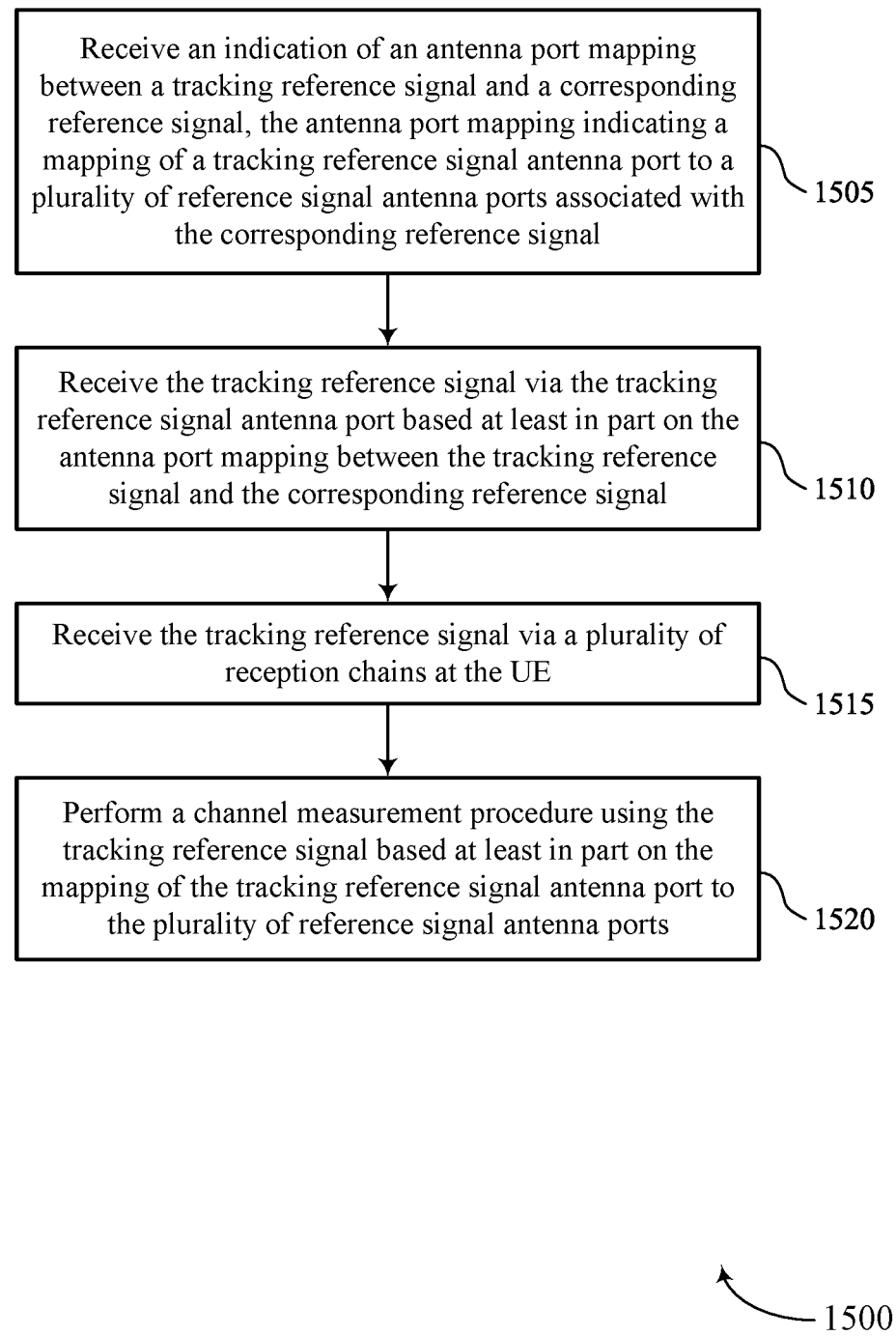

FIG. 15 shows a flowchart illustrating a method 1500 that supports multi-port PTRS port association with multiple DMRS ports in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The operations of 1505 may be performed in accordance with examples as disclosed herein. In some examples, aspects of the operations of 1505 may be performed by a mapping reception component 825 as described with reference to FIG. 8.

At 1510, the method may include receiving the tracking reference signal via the tracking reference signal antenna port based on the antenna port mapping between the tracking reference signal and the corresponding reference signal. The operations of 1510 may be performed in accordance with examples as disclosed herein. In some examples, aspects of the operations of 1510 may be performed by a reference signal reception component 830 as described with reference to FIG. 8.

At 1515, the method may include receiving the tracking reference signal via a set of multiple reception chains at the UE. The operations of 1515 may be performed in accordance with examples as disclosed herein. In some examples, aspects of the operations of 1515 may be performed by a reference signal reception component 830 as described with reference to FIG. 8.

At 1520, the method may include performing a channel measurement procedure using the tracking reference signal based on the mapping of the tracking reference signal antenna port to the set of multiple reference signal antenna ports. The operations of 1520 may be performed in accordance with examples as disclosed herein. In some examples, aspects of the operations of 1520 may be performed by a channel measurement component 835 as described with reference to FIG. 8.

Figure 16:
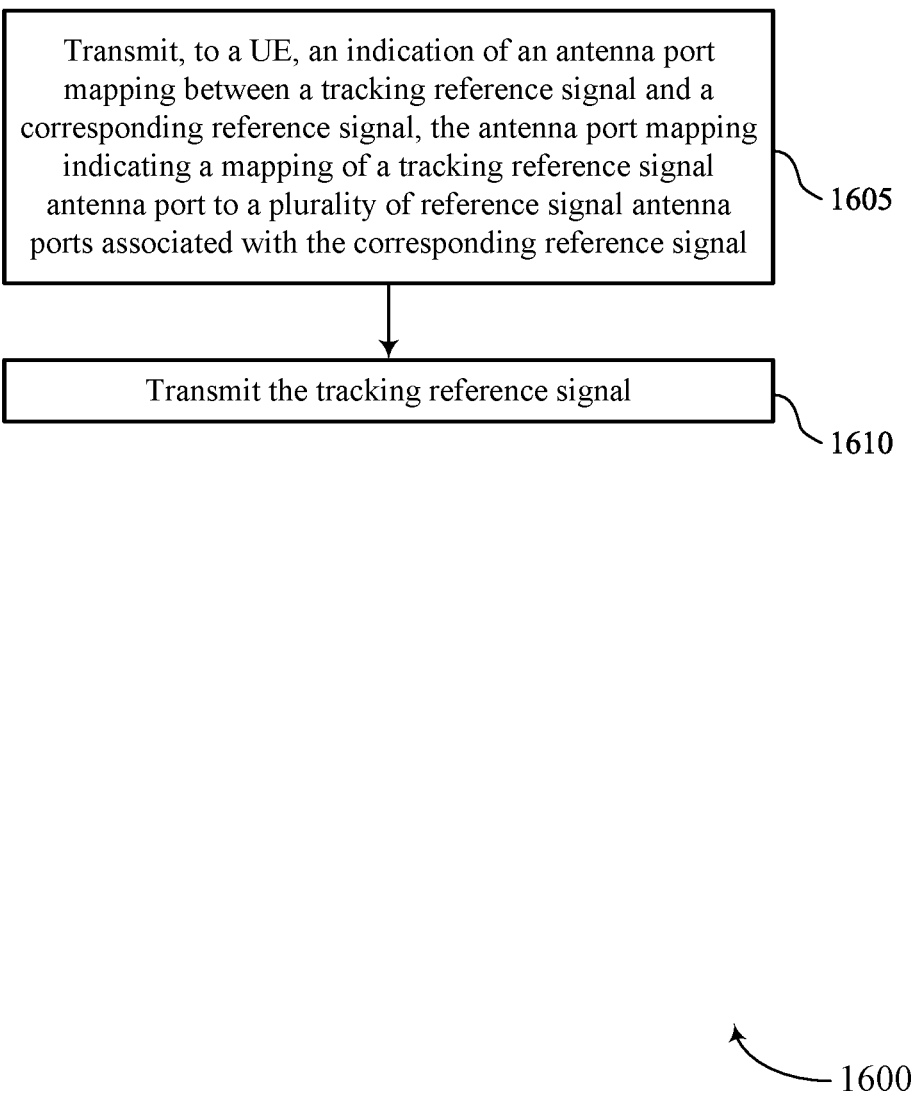

FIG. 16 shows a flowchart illustrating a method 1600 that supports multi-port PTRS port association with multiple DMRS ports in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The operations of 1605 may be performed in accordance with examples as disclosed herein. In some examples, aspects of the operations of 1605 may be performed by a mapping transmission component 1225 as described with reference to FIG. 12.

At 1610, the method may include transmitting the tracking reference signal. The operations of 1610 may be performed in accordance with examples as disclosed herein. In some examples, aspects of the operations of 1610 may be performed by a reference signal transmission component 1230 as described with reference to FIG. 12.

Figure 17:
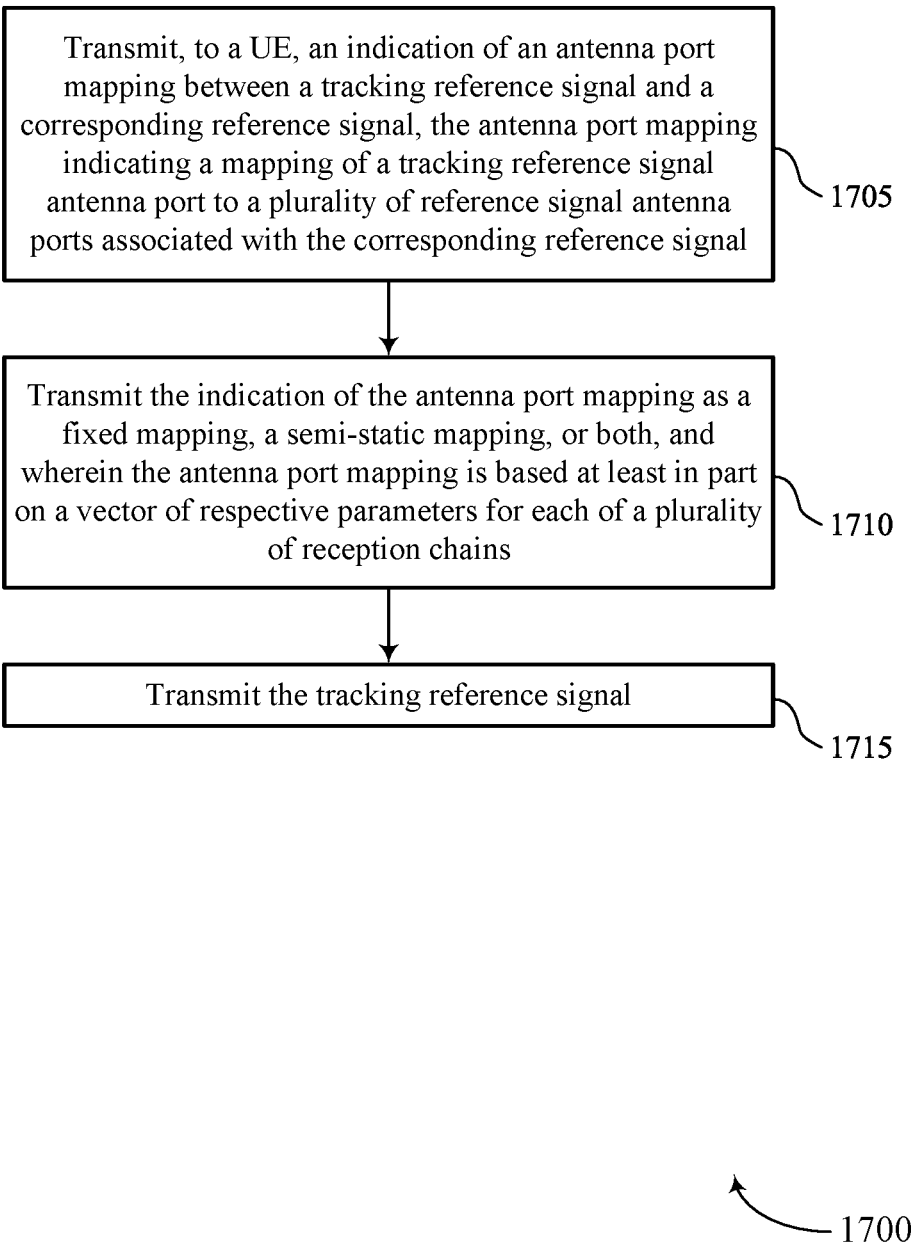

FIG. 17 shows a flowchart illustrating a method 1700 that supports multi-port PTRS port association with multiple DMRS ports in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, an indication of an antenna port mapping between a tracking reference signal and a corresponding reference signal, the antenna port mapping indicating a mapping of a tracking reference signal antenna port to a set of multiple reference signal antenna ports associated with the corresponding reference signal. The operations of 1705 may be performed in accordance with examples as disclosed herein. In some examples, aspects of the operations of 1705 may be performed by a mapping transmission component 1225 as described with reference to FIG. 12.

At 1710, the method may include transmitting the indication of the antenna port mapping as a fixed mapping, a semi-static mapping, or both, and where the antenna port mapping is based on a vector of respective parameters for each of a set of multiple reception chains. The operations of 1710 may be performed in accordance with examples as disclosed herein. In some examples, aspects of the operations of 1710 may be performed by a mapping transmission component 1225 as described with reference to FIG. 12.

At 1715, the method may include transmitting the tracking reference signal. The operations of 1715 may be performed in accordance with examples as disclosed herein. In some examples, aspects of the operations of 1715 may be performed by a reference signal transmission component 1230 as described with reference to FIG. 12.

The following provides an overview of aspects of the present disclosure:

Aspect 1: A method for wireless communication at a UE, comprising: receiving an indication of an antenna port mapping between a tracking reference signal and a corresponding reference signal, the antenna port mapping indicating a mapping of a tracking reference signal antenna port to a plurality of reference signal antenna ports associated with the corresponding reference signal; receiving the tracking reference signal via the tracking reference signal antenna port based at least in part on the antenna port mapping between the tracking reference signal and the corresponding reference signal; and performing a channel measurement procedure using the tracking reference signal based at least in part on the mapping of the tracking reference signal antenna port to the plurality of reference signal antenna ports.

Aspect 2: The method of aspect 1, wherein receiving the tracking reference signal comprises: receiving the tracking reference signal via a plurality of reception chains at the UE.

Aspect 3: The method of aspect 2, wherein performing the channel measurement procedure using the tracking reference signal comprises: performing a channel estimation using the plurality of reception chains based at least in part on the tracking reference signal and the antenna port mapping of the tracking reference signal antenna port to the plurality of reference signal antenna ports.

Aspect 4: The method of aspect 3, wherein performing the channel estimation using the plurality of reception chains comprises: determining a respective parameter for each of the plurality of reception chains.

Aspect 5: The method of any of aspects 1 through 4, further comprising: determining the antenna port mapping based at least in part on an effective channel associated with the plurality of reference signal antenna ports and an effective channel associated with the tracking reference signal antenna port.

Aspect 6: The method of any of aspects 1 through 5, wherein receiving the indication of the antenna port mapping comprises: receiving the indication of the antenna port mapping as a fixed mapping, a semi-static mapping, or both, wherein the antenna port mapping is based at least in part on a vector of respective parameters for each of one or more reception chains.

Aspect 7: The method of any of aspects 1 through 6, wherein receiving the indication of the antenna port mapping comprises: receiving the indication of the antenna port mapping, wherein the antenna port mapping is based at least in part on a codebook of precoder values.

Aspect 8: The method of any of aspects 1 through 7, wherein determining the antenna port mapping comprises:

receiving the indication of the antenna port mapping via periodic signaling, aperiodic signaling, or a combination thereof.

Aspect 9: The method of any of aspects 1 through 8, wherein receiving the indication of the antenna port mapping comprises: receiving an indication of a precoder value associated with the antenna port mapping, wherein the precoder value is based at least in part on a structure of an effective channel of the tracking reference signal antenna port, a sounding reference signal, a channel state information report, or a combination thereof.

Aspect 10: The method of any of aspects 1 through 9, wherein the tracking reference signal comprises a phase tracking reference signal.

Aspect 11: The method of aspect 10, wherein the corresponding reference signal comprises a demodulation reference signal, the method further comprising: receiving a plurality of demodulation reference signals via a plurality of demodulation reference signal antenna ports, wherein the plurality of reference signal antenna ports comprises the plurality of demodulation reference signal antenna ports; and performing the channel measurement procedure using the phase tracking reference signal, wherein the channel measurement procedure comprises performing a channel noise error estimation using a plurality of reception chains associated with a phase tracking reference signal antenna ports, wherein the channel noise error estimation comprises a phase noise error estimation, a residual frequency error estimation, or both.

Aspect 12: The method of any of aspects 1 through 11, wherein the tracking reference signal comprises a channel state information reference signal for tracking.

Aspect 13: The method of aspect 12, wherein the corresponding reference signal comprises a demodulation reference signal, the method further comprising: receiving a plurality of demodulation reference signals via a plurality of demodulation reference signal antenna ports; and performing the channel measurement procedure using the channel state information reference signal for tracking, wherein the channel measurement procedure comprises performing a channel estimation using a plurality of reception chains associated with a plurality of channel state information reference signal antenna ports.

Aspect 14: The method of aspect 13, wherein the channel estimation comprises a signal-to-noise ratio, a channel correlation value in frequency domain, a channel correlation value in time domain, a delay spread, a Doppler spread, Doppler shifts, a channel power delay profile, or any combination thereof.

Aspect 15: A method for wireless communication at a network entity, comprising: transmitting, to a UE, an indication of an antenna port mapping between a tracking reference signal and a corresponding reference signal, the antenna port mapping indicating a mapping of a tracking reference signal antenna port to a plurality of reference signal antenna ports associated with the corresponding reference signal; and transmitting the tracking reference signal.

Aspect 16: The method of aspect 15, wherein transmitting the indication of the antenna port mapping comprises: transmitting the indication of the antenna port mapping as a fixed mapping, a semi-static mapping, or both, and wherein the antenna port mapping is based at least in part on a vector of respective parameters for each of a plurality of reception chains.

Aspect 17: The method of any of aspects 15 through 16, wherein transmitting the indication of the antenna port mapping comprises: transmitting the indication of the antenna port mapping, wherein the antenna port mapping is based at least in part on a codebook of precoder values.

Aspect 18: The method of any of aspects 15 through 17, wherein transmitting the indication of the antenna port mapping comprises: transmitting an indication of a precoder value associated with the antenna port mapping, wherein the precoder value is based at least in part on a structure of an effective channel of the tracking reference signal antenna port, a sounding reference signal, a channel state information report, or a combination thereof.

Aspect 19: The method of any of aspects 15 through 18, wherein the tracking reference signal comprises a phase tracking reference signal.

Aspect 20: The method of aspect 19, wherein the corresponding reference signal comprises a demodulation reference signal, the method further comprising: transmitting a plurality of demodulation reference signals via a plurality of demodulation reference signal antenna ports, wherein the plurality of reference signal antenna ports comprises the plurality of demodulation reference signal antenna ports.

Aspect 21: The method of any of aspects 15 through 20, wherein the tracking reference signal comprises a channel state information reference signal for tracking.

Aspect 22: The method of aspect 21, wherein the corresponding reference signal comprises a demodulation reference signal, the method further comprising: transmitting a plurality of demodulation reference signals via a plurality of demodulation reference signal antenna ports, wherein the plurality of reference signal antenna ports comprises the plurality of demodulation reference signal antenna ports.

Aspect 23: An apparatus for wireless communication, comprising a processor; memory; the processor being configured to, based at least in part on information stored in the memory perform a method of any of aspects 1 through 14.

Aspect 24: An apparatus for wireless communication, comprising at least one means for performing a method of any of aspects 1 through 14.

Aspect 25: A non-transitory computer-readable medium storing code for wireless communication at a UE, the code comprising instructions executable by a processor to perform a method of any of aspects 1 through 14.

Aspect 26: An apparatus for wireless communication, comprising a processor; memory; the processor being configured to, based at least in part on information stored in the memory perform a method of any of aspects 15 through 22.

Aspect 27: An apparatus for wireless communication, comprising at least one means for performing a method of any of aspects 15 through 22.

Aspect 28: A non-transitory computer-readable medium storing code for wireless communication at a network entity, the code comprising instructions executable by a processor to perform a method of any of aspects 15 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving an indication of an antenna port mapping between a tracking reference signal and a corresponding reference signal, the antenna port mapping indicating a mapping of a tracking reference signal antenna port to a plurality of reference signal antenna ports associated with the corresponding reference signal;

receiving the tracking reference signal via the tracking reference signal antenna port based at least in part on the antenna port mapping between the tracking reference signal and the corresponding reference signal; and performing a channel measurement procedure using the tracking reference signal based at least in part on the mapping of the tracking reference signal antenna port to the plurality of reference signal antenna ports.

2. The method of claim 1, wherein receiving the tracking reference signal comprises:

receiving the tracking reference signal via a plurality of reception chains at the UE.

3. The method of claim 2, wherein performing the channel measurement procedure using the tracking reference signal comprises:

performing a channel estimation using the plurality of reception chains based at least in part on the tracking reference signal and the antenna port mapping of the tracking reference signal antenna port to the plurality of reference signal antenna ports.

4. The method of claim 3, wherein performing the channel estimation using the plurality of reception chains comprises:

determining a respective parameter for each of the plurality of reception chains.

5. The method of claim 1, further comprising:

determining the antenna port mapping based at least in part on an effective channel associated with the plurality of reference signal antenna ports and an effective channel associated with the tracking reference signal antenna port.

6. The method of claim 1, wherein receiving the indication of the antenna port mapping comprises:

receiving the indication of the antenna port mapping as a fixed mapping, a semi-static mapping, or both, wherein the antenna port mapping is based at least in part on a vector of respective parameters for each of one or more reception chains.

7. The method of claim 1, wherein receiving the indication of the antenna port mapping comprises:

receiving the indication of the antenna port mapping, wherein the antenna port mapping is based at least in part on a codebook of precoder values.

8. The method of claim 1, wherein determining the antenna port mapping comprises:

receiving the indication of the antenna port mapping via periodic signaling, aperiodic signaling, or a combination thereof.

9. The method of claim 1, wherein receiving the indication of the antenna port mapping comprises:

receiving an indication of a precoder value associated with the antenna port mapping, wherein the precoder value is based at least in part on a structure of an effective channel of the tracking reference signal antenna port, a sounding reference signal, a channel state information report, or a combination thereof.

10. The method of claim 1, wherein the tracking reference signal comprises a phase tracking reference signal.

11. The method of claim 10, wherein the corresponding reference signal comprises a demodulation reference signal, the method further comprising:

receiving a plurality of demodulation reference signals via a plurality of demodulation reference signal antenna ports, wherein the plurality of reference signal antenna ports comprises the plurality of demodulation reference signal antenna ports; and performing the channel measurement procedure using the phase tracking reference signal, wherein the channel measurement procedure comprises performing a channel noise error estimation using a plurality of reception chains associated with a phase tracking reference signal antenna ports, wherein the channel noise error estimation comprises a phase noise error estimation, a residual frequency error estimation, or both.

12. The method of claim 1, wherein the tracking reference signal comprises a channel state information reference signal for tracking.

13. The method of claim 12, wherein the corresponding reference signal comprises a demodulation reference signal, the method further comprising:

receiving a plurality of demodulation reference signals via a plurality of demodulation reference signal antenna ports; and performing the channel measurement procedure using the channel state information reference signal for tracking, wherein the channel measurement procedure comprises performing a channel estimation using a plurality of reception chains associated with a plurality of channel state information reference signal antenna ports.

14. The method of claim 13, wherein the channel estimation comprises a signal-to-noise ratio, a channel correlation value in frequency domain, a channel correlation value in time domain, a delay spread, a Doppler spread, Doppler shifts, a channel power delay profile, or any combination thereof.

15. A method for wireless communication at a network entity, comprising:

transmitting, to a user equipment (UE), an indication of an antenna port mapping between a tracking reference signal and a corresponding reference signal, the antenna port mapping indicating a mapping of a tracking reference signal antenna port to a plurality of reference signal antenna ports associated with the corresponding reference signal; and transmitting the tracking reference signal for a channel measurement procedure using the tracking reference signal based at least in part on the mapping of the tracking reference signal antenna port to the plurality of reference signal antenna ports.

16. The method of claim 15, wherein transmitting the indication of the antenna port mapping comprises:

transmitting the indication of the antenna port mapping as a fixed mapping, a semi-static mapping, or both, and wherein the antenna port mapping is based at least in part on a vector of respective parameters for each of a plurality of reception chains.

17. The method of claim 15, wherein transmitting the indication of the antenna port mapping comprises:

transmitting the indication of the antenna port mapping, wherein the antenna port mapping is based at least in part on a codebook of precoder values.

18. The method of claim 15, wherein transmitting the indication of the antenna port mapping comprises:

transmitting an indication of a precoder value associated with the antenna port mapping, wherein the precoder value is based at least in part on a structure of an effective channel of the tracking reference signal antenna port, a sounding reference signal, a channel state information report, or a combination thereof.

19. The method of claim 15, wherein the tracking reference signal comprises a phase tracking reference signal.

20. The method of claim 19, wherein the corresponding reference signal comprises a demodulation reference signal, the method further comprising:

transmitting a plurality of demodulation reference signals via a plurality of demodulation reference signal antenna ports, wherein the plurality of reference signal antenna ports comprises the plurality of demodulation reference signal antenna ports.

21. The method of claim 15, wherein the tracking reference signal comprises a channel state information reference signal for tracking.

22. The method of claim 21, wherein the corresponding reference signal comprises a demodulation reference signal, the method further comprising:
transmitting a plurality of demodulation reference signals via a plurality of demodulation reference signal antenna ports, wherein the plurality of reference signal antenna ports comprises the plurality of demodulation reference signal antenna ports.

23. A user equipment (UE) for wireless communication comprising:
one or more memories storing processor-executable code; and
one or more processors coupled with the one or more memories and individually or collectively operable to execute the code to cause the UE to:
receive an indication of an antenna port mapping between a tracking reference signal and a corresponding reference signal, the antenna port mapping indicating a mapping of a tracking reference signal antenna port to a plurality of reference signal antenna ports associated with the corresponding reference signal;
receive the tracking reference signal via the tracking reference signal antenna port based at least in part on the antenna port mapping between the tracking reference signal and the corresponding reference signal; and
perform a channel measurement procedure using the tracking reference signal based at least in part on the mapping of the tracking reference signal antenna port to the plurality of reference signal antenna ports.

24. The UE of claim 23, wherein, to receive the tracking reference signal, the one or more processors are individually or collectively operable to execute the code to cause the UE to:
receive the tracking reference signal via a plurality of reception chains.

25. The UE of claim 24, wherein, to perform the channel measurement procedure using the tracking reference signal, the one or more processors are individually or collectively operable to execute the code to cause the UE to:
perform a channel estimation using the plurality of reception chains based at least in part on the tracking reference signal and the antenna port mapping of the tracking reference signal antenna port to the plurality of reference signal antenna ports.

26. The UE of claim 25, wherein, to perform the channel estimation using the plurality of reception chains, the one or more processors are individually or collectively operable to execute the code to cause the UE to:
determine a respective parameter for each of the plurality of reception chains.

27. The UE of claim 23, wherein the one or more processors are individually or collectively further operable to execute the code to cause the UE to:
determine the antenna port mapping based at least in part on an effective channel associated with the plurality of reference signal antenna ports and an effective channel associated with the tracking reference signal antenna port.

28. The UE of claim 23, wherein, to receive the indication of the antenna port mapping, the one or more processors are individually or collectively operable to execute the code to cause the UE to:
receive the indication of the antenna port mapping as a fixed mapping, a semi-static mapping, or both, wherein the antenna port mapping is based at least in part on a vector of respective parameters for each of one or more reception chains.

29. A network entity for wireless communication, comprising: one or more memories storing processor-executable code; and one or more processors coupled with the one or more memories and individually or collectively operable to execute the code to cause the network entity to transmit an indication of an antenna port mapping between a tracking reference signal and a corresponding reference signal, the antenna port mapping indicating a mapping of a tracking reference signal antenna port to a plurality of reference signal antenna ports associated with the corresponding reference signal; and transmit the tracking reference signal based at least in part on the mapping of the tracking reference signal antenna port to the plurality of reference signal antenna ports.

30. The network entity of claim 29, wherein, to transmit the indication of the antenna port mapping, the one or more processors are individually or collectively operable to execute the code to cause the network entity to:
transmit the indication of the antenna port mapping as a fixed mapping, a semi-static mapping, or both, and wherein the antenna port mapping is based at least in part on a vector of respective parameters for each of a plurality of reception chains.

* * * * *